(12) United States Patent
Wyeld

(10) Patent No.: US 8,902,224 B2
(45) Date of Patent: Dec. 2, 2014

(54) METHOD AND SYSTEM FOR DISPLAY OF OBJECTS IN 3D

(75) Inventor: Theodor Gregory Wyeld, Stonyfell (AU)

(73) Assignee: Thereitis.com Pty Ltd., Adelaide (AU)

( * ) Notice: Subject to any disclaimer, the term of this patent is extended or adjusted under 35 U.S.C. 154(b) by 0 days.

(21) Appl. No.: 13/577,895

(22) PCT Filed: Feb. 10, 2011

(86) PCT No.: PCT/AU2011/000136
§ 371 (c)(1),
(2), (4) Date: Dec. 20, 2012

(87) PCT Pub. No.: WO2011/097675
PCT Pub. Date: Aug. 18, 2011

(65) Prior Publication Data
US 2013/0097554 A1    Apr. 18, 2013

(30) Foreign Application Priority Data

Feb. 10, 2010  (AU) ............................... 2010900534

(51) Int. Cl.
*G06T 15/00*   (2011.01)
*G06F 3/0481*  (2013.01)
*G06F 17/30*   (2006.01)
*G06K 9/62*    (2006.01)
*G06T 19/00*   (2011.01)

(52) U.S. Cl.
CPC ...... *G06F 3/04815* (2013.01); *G06F 17/30554* (2013.01); *G06K 9/6248* (2013.01); *G06T 19/00* (2013.01)
USPC ...................................................... 345/419

(58) Field of Classification Search
None
See application file for complete search history.

(56) References Cited

U.S. PATENT DOCUMENTS 6,556,723 B2 * 4/2003 Craver et al. ................. 382/294
7,079,142 B2   7/2006 Chiu et al.

(Continued)

OTHER PUBLICATIONS

Wyeld, T. & Zankl, A., 2008. 3D visualisation of the radiological features of type II collagenopathies associated with skeletal dysplasias. Proceedings—5th International Conference BioMedical Visualization, Information Visualization in Medical and Biomedical Informatics, MediVis 2008, (4618613), 53-56.

(Continued)

*Primary Examiner* — Edward Martello
(74) *Attorney, Agent, or Firm* — Beyer Law Group LLP

(57) ABSTRACT

Effectively displaying the results of a search, or identifying a specific object in a collection when the user only has a vague recollection of the properties of the object or is uncertain of the best search terms to use, is a difficult problem. To address such difficulties a method for displaying a collection of objects in three dimensions (3D) is described. Each object is represented using an image or icon and has associated metadata. Common metadata attributes such as colour (RGB, Brightness), creation date, title etc, between the objects are used to define a data space and each object is assigned a point in the dataspace. The dataspace is then projected down to a 3D viewing space where a representation or image of the object will be displayed in. To improve the visualisation of the objects, the projected points are adjusted so as to reduce the clustering of points whilst maintaining or preserving the order of the points. This declustering step preserves the structural relationship between the objects while optimising the viewing volume (effectively reducing void spaces in the displayed collection) thus improving the visual representation of the collection and allowing more efficient identification and selection of an object in the collection. The method can be used for visualising search results, files on a computer, objects in a physical library, or products for sale on a website, and can produce up to an 80% reduction in search times.

45 Claims, 9 Drawing Sheets

(56) References Cited

U.S. PATENT DOCUMENTS

| | | | |
|---|---|---|---|
| 7,233,341 B1* | 6/2007 | Sauerbrei | 345/672 |
| 7,555,471 B2 | 6/2009 | Hogue et al. | |
| 2005/0055182 A1 | 3/2005 | Rosel et al. | |
| 2006/0143176 A1 | 6/2006 | Mojsilovic et al. | |
| 2007/0209012 A1 | 9/2007 | Mazery | |
| 2008/0016451 A1 | 1/2008 | Funabashi et al. | |
| 2008/0155426 A1 | 6/2008 | Robertson et al. | |
| 2008/0235574 A1 | 9/2008 | Telek et al. | |
| 2008/0295036 A1 | 11/2008 | Ikeda et al. | |
| 2008/0307360 A1 | 12/2008 | Chaudhri et al. | |
| 2009/0052787 A1 | 2/2009 | Satoh | |
| 2009/0228299 A1 | 9/2009 | Kangarloo et al. | |
| 2009/0324073 A1 | 12/2009 | Wengler et al. | |
| 2011/0264649 A1* | 10/2011 | Hsiao et al. | 707/722 |

OTHER PUBLICATIONS

Theodor G Wyeld, A non-expert organised visual database: a case study in using the Amazon metric to search images, Proceedings of the 11th IEEE International Conference on Information Visualisation (IV 07), Zurich, Switzerland, Jul. 4-6, 2007, pp. 431-435.

Jakobsen, I.B., Wyeld, T., Hansen, D.P., & Zankl, A., 2007. Visualising a skeletal dysplasia knowledgebase. BioMedical visualization: 4th International Conference on Medical Information Visualization (MediViz07), (4272109), 43-47.

Theodor G Wyeld, Robert M Colomb, Using the Amazon Metric to Construct an Image Database based on what people do, not what they say. Proceedings of the $10^{th}$ IEEE International Conference on Information Visualisation (IV'06), London, England, Jul. 5-7, 2006, pp. 74-79.

Printout of http://perspectives.3ds.com/2009/07/09/visual-search-engines/ published Jul. 9, 2009, accessed Nov. 23, 2009.

Printout of http://www.search-cube.com/?#, accessed Nov. 23, 2009.

Yushi Jing & Shumeet Baluja, PageRank for Product Image Search, WWW 2008, Apr. 21-25, 2008, Beijing, China, p. 307-315.

Kules, William, Wilson, Max L., Schraefel, M.C. and Shneiderman, Ben (2008) From Keyword Search to Exploration: How Result Visualization Aids Discovery on the Web. University of Southhampton Eprint (http://eprints.soton.ac.uk/id/eprint/265169).

Veltkamp, Remco C., Tanase, M, Content-Based Image Retrieval Systems: A Survey, University of Utrecht, 2000, preprint: http://igitur-archive.library.uu.nl/math/2001-0219-162808/2000-34.pdf.

* cited by examiner

METHOD AND SYSTEM FOR DISPLAY OF OBJECTS IN 3D

PRIORITY DOCUMENTS

The present application claims priority from Australian Provisional Patent Application No 2010900534 entitled "METHOD AND SYSTEM FOR 3D OBJECT DISPLAY" and filed on 10 Feb. 2010, and which has been assigned to the applicant, the content of which is hereby incorporated by reference in its entirety.

FIELD OF THE INVENTION

The present invention relates to the display of objects in three dimensions (3D).

BACKGROUND OF THE INVENTION

In many instances it is desirable to locate a specific object from a collection. For example, a person may wish to locate a physical report in a library, or a specific document or image file on their hard disk, computer database or on the web. However in many instances, the person may only have an imperfect recollection of one or more characteristics of the desired object, or possibly the characteristics of a related object (or objects) and the nature of the relationship to the desired object. These characteristics may relate to the actual document (e.g. title, author, or text), a property of the document (size, shape, or cover image), or even related documents which are located nearby or were created at a similar time, day or place. In other cases a person may not have a specific object in mind, but may simply wish to browse a complete or large collection on the basis of a list of characteristics of interest, and then see which items appeal to them.

Some of these characteristics may easily be searched if known, such as title, author, creation date, publication date and reference number. However in many cases the remembered characteristics are not easily searchable or are only indirectly related to the desired object and are thus typically insufficient to allow identification of the desired document in the collection, particularly when using computational search tools. For example, they may relate the approximate physical location on a shelf in a library, the colour of nearby reports, the approximate relative location to distinctive nearby reports, the visual layout of the front page, the colour of the front page, a distinctive feature on the front page (e.g. a logo), or perhaps a feature in the image such as a specific person, or object (e.g. Eiffel tower) who were associated with the object sought. In some cases if one can identify the location of a related image (i.e. one having a shared or related characteristic) this location can be used to locate the desired object. For example if one can locate a image file with the Eiffel tower in it, one could locate the directory the image was located in, and this directory could be browsed to locate the desired object.

In the case where the objects are computer files, or are represented in a database, a computational search engine with a graphical user interface may be used to locate a desired object. This approach allows a user to enter one or more properties of the desired object, and the search engine will attempt to find and display all objects satisfying the search criteria. Typically the search engine will have a user interface which allows the results to be displayed in a range of formats such as a 2 dimensional (2D) grid of thumbnail images (visual representations), icons, or filenames, or as a detailed 1 dimensional (1D) list of filenames and file properties (in which each column is a property). Other alternatives have been explored, such as network graphs, hierarchical clusters, as well as 2.5 (eg distributed on an inclined plane) and 3D approaches in which 3 search characteristics or search terms define each of the 3 axes. Some user interfaces such as tree file explorers provided by the operating system allow the items to be sorted based on filenames or associated file properties (e.g. file type, creation date, file size etc.). Whilst this approach allows a user to view objects in a range of directories on a hard disk (or in a database or on the internet, etc), according to various criteria, this approach is only usable if the remembered characteristic is a searchable characteristic. Also in many cases multiple search terms may be used to describe a characteristic and if the user inputs a poor or narrow search term, then they may miss potentially relevant results.

If the characteristic is not searchable then the user can attempt to find the desired object by using a graphical file manager or similar application to browse through directories or locations which might contain the desired object. Such graphical file managers typically have a user interface similar to search engines in which results are presented in a 2D grid or list (often a search engine is integrated into a file manager application). However one limitation with this approach is that as the number of files in the directory increases it is difficult to see all, or at least a large percentage of the items, at the one time.

Further, even when a large collection of results are displayed in 2D or 3D, the representation of these results is often less than optimal. In some cases they are simply arranged on a regular grid losing all concept of the actual order and separation of the results. In other cases the results are displayed based upon the value of the searched characteristics (ie as a coordinate point). However the search results will frequently include a number of clusters or be clumped in a single large cluster containing most of the data which often occurs when there are a few points which are located at a large distance from other points, and such effects makes identification of individual objects in the collection difficult, thereby negating the effectiveness of the visualisation technique used.

There is thus a need to provide an improved method for displaying a collection of objects.

SUMMARY OF THE INVENTION

According to a first aspect of the present invention, there is provided a method for displaying a plurality of objects in a three dimensional (3D) viewing space on a display device, each object having a plurality of associated metadata attributes, the method including:

associating a point in a 3 dimensional (3D) viewing space for each of the plurality of objects, wherein each dimension is based upon one or more metadata attributes and each coordinate of the point is based upon the value of the respective metadata attributes of the object;

adjusting the point associated with each object wherein the adjustment is performed so as to reduce the clustering of points in the 3D viewing space whilst maintaining the relative order of the points; and providing the adjusted points to a display device for displaying a visual representation of each of the plurality of objects to a user.

In a further aspect, maintaining the relative order of the points includes maintaining the relative per axis order of the points for each axis of the 3D viewing space.

In a further aspect, the step of associating a point in a 3D viewing space includes:

receiving a set of metadata attributes associated with the plurality of objects;

defining a dataspace based upon the set of metadata attributes, wherein each point in the dataspace is represented by an n-tuple, wherein each element of the n-tuple is associated with at least one of the metadata attribute in the set;

associating an n-tuple with each object based on the values of the associated metadata attributes;

defining a 3D viewing space based upon an axis wise linear combination of the metadata attributes associated with each of the plurality of objects; and projecting the n-tuple associated with each object into the 3D viewing space to obtain a point associated with the object in the 3D viewing space.

In a further aspect, the set of metadata attributes associated with the plurality of objects are selected by a user using an associated user interface.

In a further aspect, the step of associating an n-tuple with each object further includes ordering one or more of the plurality of associated metadata attributes according to a predetermined ordering criteria for at least one of the elements in the n-tuple and assigning the rank of the object in the ordering as the value of the respective element in the n-tuple.

In a further aspect, the method includes scaling the n-tuple associated with each object, so that each of the n-elements of the n-tuples have a common scale. In a further aspect, the common scale is [0, 1].

In a further aspect, the step of projecting the n-tuple associated with each object further includes:

associating a unit length projection vector in the 3D viewing space with each element of the n-tuple, wherein each unit length projection vector begins at the origin of the 3D viewing space;

associating a point in the 3D viewing space with the object by projecting each n-tuple using the vector associated with each element of the n-tuple; and separately scaling each of the 3 axes, such that all points are in the range [0, 1] and the prescaling order of the points along each axis is preserved.

In a further aspect, the step of adjusting the point associated with each object includes:

resealing each point so that all points are distributed within an S×S×S cube in the 3D viewing space;

adjusting the coordinates of the plurality of points, wherein the coordinates associated with each axis of the 3D viewing space are separately adjusted and the adjustment method for adjusting the coordinate associated with an axis includes:

sorting the points on the basis of the value of the coordinate associated with a first axis;

associating an empty grid with the plurality of sorted points wherein the first dimension of the grid is associated with the coordinate associated with the second axis and the second dimension of the grid is associated with the coordinate associated with the third axis;

associating a grid clear counter with the grid, wherein the initial value of the grid clear counter is zero;

associating each point with a grid cell according to the sorted order and assigning the current value of the grid clear counter with the adjusted value, wherein associating a point with a grid cell comprises:

calculating an initial grid cell location for the point based upon rounding to the nearest integer the coordinates of the point associated with each dimension of the grid;

searching for the first empty, grid cell in a search space of a predetermined search size centred on the initial grid cell location wherein if an empty grid cell is found, then associating and occupying the empty grid cell with the point and assigning the current value of the grid clear counter to the adjusted value of the point, else if no empty grid cell is found in the search space then emptying the grid, incrementing the grid clear counter and associating and occupying the now empty grid cell corresponding to the initial grid cell location with the point and assigning the current value of the grid clear counter to the adjusted value of the point.

In a further aspect, the predetermined search size is two grid cells in either direction from a central cell.

In a further aspect, S is calculated using the scaling function $$S = \sqrt[C]{N} + M = N^{\frac{1}{C}} + M,$$

where C is an estimate of the clustering of the data and is the range [1,3.5] and M is a lower size limit and is in the range [0, 0.1].

In a further aspect, a post adjustment scaling factor is applied to all points.

In a further aspect, the one or more metadata attributes used to base dimensions of the 3D viewing space on are selected by the user.

In a further aspect, the step of adjusting the point associated with each object is performed using a statistically based adjustment.

In a further aspect, the step of adjusting the point associated with each object includes for at least one axis in the 3D viewing space:
    determining an estimate of the average spacing of points along the respective axis;
    iterating through the points associated with each object according to the order of points along the respective axis;
    determining the on axis distance to the previous point; and
    adjusting the value of the coordinate of the current point so that the on axis distance to the previous point is closer to the determined estimate.

In a further aspect, the adjusted value is the location of the previous point plus the determined distance multiplied by a scaling factor, wherein if the determined distance was greater than the average spacing then the scaling factor is less than 1, and if the determined distance was less than the average spacing then the scaling factor is greater than 1.

In a further aspect, wherein the step of adjusting the point associated with each object includes:

determining the on-axis average spacing of a predetermined number of adjacent points for at least one axis in the 3D viewing space; and increasing the spacing of the predetermined number of adjacent points if the determined average spacing is less than a predetermined minimum spacing threshold.

In a further aspect, the step of adjusting the point associated with each object includes:

for at least one axis in the 3D viewing space:
    iterating through the points associated with each object according to the order of points along the respective axis; and
    adjusting the value of the coordinate of each point by addition of an offset distance if it is less than a threshold distance from the coordinate value of the previous point for the respective axis.

In a further aspect, the offset distance is a fixed distance from the previous point.

In a further aspect, the step of providing the adjusted points to a display device for displaying to a user includes:
 defining a viewing point in the 3D viewing space;
 associating a visual representation with each object;
 orientating the visual representation associated with each object in a plane substantially normal to the vector defined by the viewing point and the adjusted point associated with the object; and
 providing the plurality of orientated visual representations and the viewing point to a display device for display to a user.

In a further aspect, the method further includes the step of receiving a plurality of objects, wherein the plurality of objects are the results of a search performed by a user in an associated user interface.

In a further aspect, the method further includes the step of receiving a plurality of objects, wherein the plurality of objects are obtained by user selection in an associated user interface.

According to a second aspect of the present invention, there is provided a system for displaying a plurality of objects in a three dimensional (3D) viewing space on a display device, the system including:
 a first computing device including a processor and associated memory, the memory containing instructions for:
  receiving a plurality of objects, each of the plurality of objects having a plurality of associated metadata attributes;
  associating a point in a 3 dimensional (3D) viewing space for each of the plurality of objects, wherein each dimension is based upon one or more metadata attributes and each coordinate of the point is based upon the value of the respective metadata attributes of the object;
  adjusting the point associated with each object wherein the adjustment is performed so as to reduce the clustering of points in the 3D viewing space whilst maintaining the relative order of the points;
  providing the adjusted points to a display device; and
 a display device for displaying a representation of each of the plurality of objects in a user interface based upon the adjusted points received from the first computing device.

In a further aspect, the user interface further receives a search criteria from the user and provides the search criteria to the first computing device and the first computing devices locates the plurality of objects based upon the search criteria.

In a further aspect, the user interface further receives a search criteria from the user and an second computing device associated with the display device performs a search and locates a plurality of objects, and provides the plurality of objects to the first computing device.

In a further aspect, the user interface further receives one or more metadata attributes from the user and provides the one or more metadata attributes to the first computing device for defining the dimensions of the 3D viewing space.

The invention may be provided in the form of computer usable medium having a computer readable program code or instructions which is adapted to be executed to implement one of the methods described herein. The computer readable medium may be provided as a computer program product. Alternatively or additionally the invention may be provided in the form of an apparatus comprising a processor and a memory, the apparatus in communication with a display device, with the apparatus being adapted to execute one of the methods described herein and to display the results on the display device.

BRIEF DESCRIPTION OF THE DRAWINGS

Illustrative embodiments of the present invention will be discussed with reference to the accompanying figures wherein.

In the following description, like reference characters designate like or corresponding parts throughout the Figures.

DESCRIPTION OF ILLUSTRATIVE EMBODIMENTS

Figure 1:
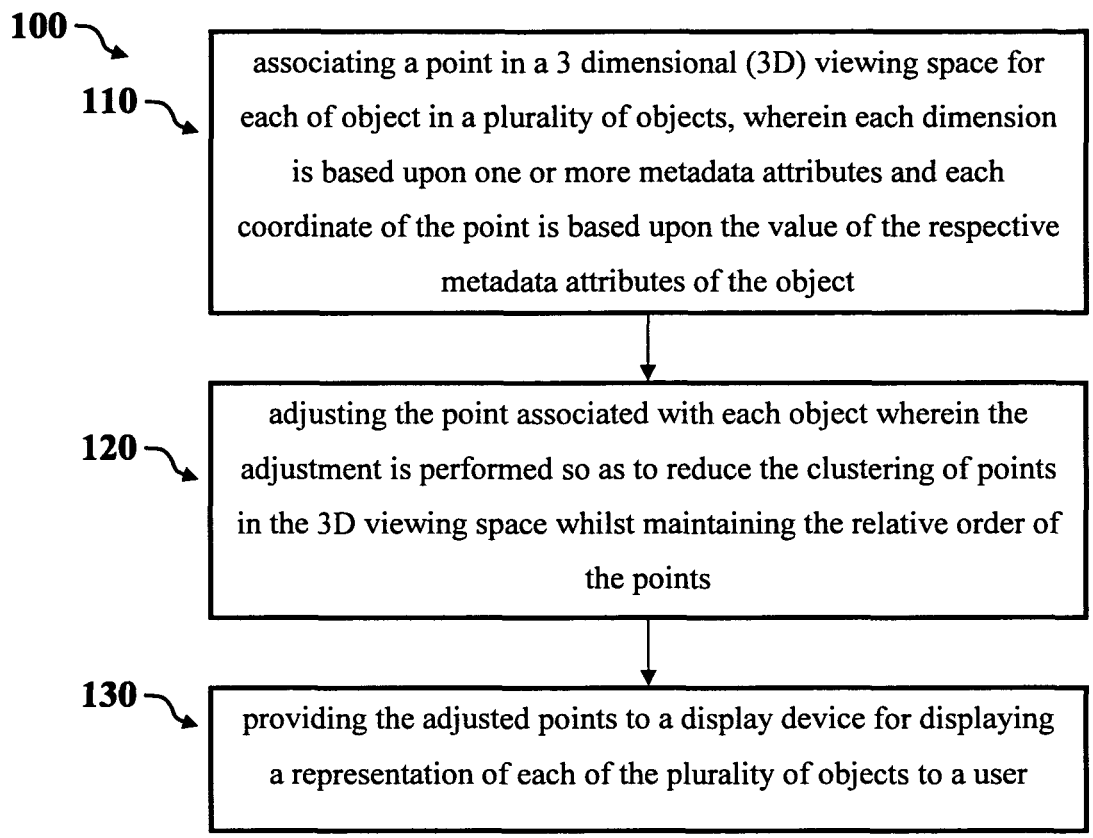
FIG. 1 is a flowchart of a method 100 for displaying a plurality of objects in a three dimensional (3D) viewing space on a display device according to an embodiment of the invention.

Referring now to FIG. 1, there is shown a method 100 for displaying a plurality of objects in a three dimensional (3D) viewing space on a display device according to an embodiment of the invention. The method can be used to effectively and efficiently display visual representations of each object (such as images or icons) in a 3D viewing space based on metadata attributes or properties. The points in the 3D space are adjusted in a way that preserves the structural relationship between the objects whilst optimising the viewing volume.

This allows a user to visualise and navigate the collection or set of objects and rapidly identify an object, or objects of interest.

The method includes the first step 110 of associating a point in a 3 dimensional (3D) viewing space (or world space) for each of the plurality of objects to be displayed (the collection of objects). Each of the objects has a plurality of metadata attributes associated with the object and each of the dimensions of the 3D viewing space can be based upon, or defined by one or more of the available metadata attributes. In this way each coordinate of the point associated with an object is based upon the value of the respective metadata attributes of the object. That is the values of the metadata attributes for an object are used to map or project them into the 3D viewing space. The choice of which metadata attributes to use to base the 3D viewing space on may be predefined during configuration of an application (eg a default set may be specified) or may be received from a user using an associated user interface.

Frequently the original or projected distribution of points in the 3D viewing space often shows clustering, with some areas having a high density of points and other areas having large void spaces. This can occur when the majority of points have similar values and a small percentage have quite different values. Thus to improve the overall visual representation of the collection of points, and thereby allow the user to more easily visualise the complete collection of points, a further adjustment step 120 is performed which includes adjusting the point associated with each object in the 3D viewing space wherein the adjustment is performed so as to reduce the clustering of points in the 3D viewing space and thus optimise or improve the display of the points in the viewing volume or space. This adjustment or declustering (or redistribution, or void reduction) operation is performed in such a way as to maintain the relative order of the points or structural relationship between the points. This may be with respect to all the dimensions simultaneously, or it may be done by maintaining the relative per axis order of the points for each axis of the 3D viewing space. In some embodiments, the adjustment need not be strict preservation of order in the sense that some minor reordering of clustered points may be allowed provided that the substantial order or structure is retained. For example if there are many points in a cluster, then ordering of some of the points in the cluster may be adjusted to improve the overall visual appearance of the cluster or collection of points.

Once the points have been adjusted or declustered (or as each point is adjusted) a display step 130 is performed in which the adjusted points are provided to a display device for displaying a representation of each of the plurality of objects to a user. The steps of adjusting the points and provision of adjusted points may be performed sequentially or in parallel, or in a series of batches as required. The actual implementation will depend upon factors such as the computational load and resources of the apparatus, or whether a distributed arrangement is used, such as a backend server performing the processing and providing the points to a remote device which displays the results.

The objects to be displayed may be a predetermined collection of objects, or a set of objects obtained from performing a search, or a subset of a wider set which has somehow been narrowed down (such as according to date or location). Creating or determining the set of objects to be displayed is typically a pre-processing step and may be determined by a website creator, a user or as the result of a search. The objects to be displayed may be electronic documents, images or files on a user's computer, website, database, or the interne, or physical objects such as reports or documents in a library, houses for sale, or shirts sold by a particular store. In each case, each object will have a plurality of metadata attributes associated with the object. Different types of objects may have different metadata attributes, although the plurality of objects to be displayed will have a common set of metadata attributes. In some cases the metadata attributes may be determined from the visual representation of the object. In general there will be many (common) metadata attributes which could be used to display a collection of objects, and choosing different sets of metadata attributes will results in different distributions in the 3D viewing space.

The display device displays a visual representation of each of the objects. This may be a predefined visual representation or image associated with the object, such as one generated by the operating system and/or related application. For example, if the object is an image file, the image (or visual representation) could be a thumbnail version of the image, and if the object is an electronic document such as a MSoffice or OpenOffice document, a HTML file, PDF or other, then the image (or visual representation) could be a thumbnail representation of the first page, icon, or an image representing the file type or some other characteristic related to the object. The visual representation or image may be associated with the object prior to performing the method, such as those generated or provided by the operating system, or they may be generated on the fly as required or even generated by the display device once the adjusted points are provided to the display device.

The metadata associated with the object comprises a range of metadata attributes or parameters (types), and could be a characteristic of the computer file, such as filename, size, creation date, etc. Additionally or alternatively, the metadata attributes or parameters may be based on contents of the file, such as average Red, Green or Blue (RGB) pixel values, brightness, hue, or even the presence of a recognisable object such as a person or location (e.g. the Eiffel tower) or shape (e.g. stripes) in the image etc. Average values may be robust averages, or other estimates of the central tendency such as median. Alternatively or additionally the metadata may relate to some characteristic of the real object the computer file represents, for example the physical location of a physical document in a library (e.g., shelf, order along the shelf), or physical size of the object (length, height, number of pages etc).

A metadata attribute may be obtained from the image or visual representation associated with the object. A pre-processing step may be performed to obtain image metadata for each object to be displayed. In the case of a document, this could be performed based on the print view and for multi page images this could be done on just the first page, or be summed over all pages. Image analysis routines could be applied to images and attempt to characterise the images (e.g. RGB, brightness, contrast, Hue, Saturation etc) or identify features in the image (objects, faces, buildings, patterns such as stripes or diagonal lines, geometric shapes such as circles or stars, etc). Depending upon the computational requirements, such pre-processing could be done in real time (i.e. as the method is invoked), or pre-computed and stored or associated with the object for later use. This would facilitate the use of computationally intensive analysis of the file, such as that required to identify specific objects in the file.

Figure 2:
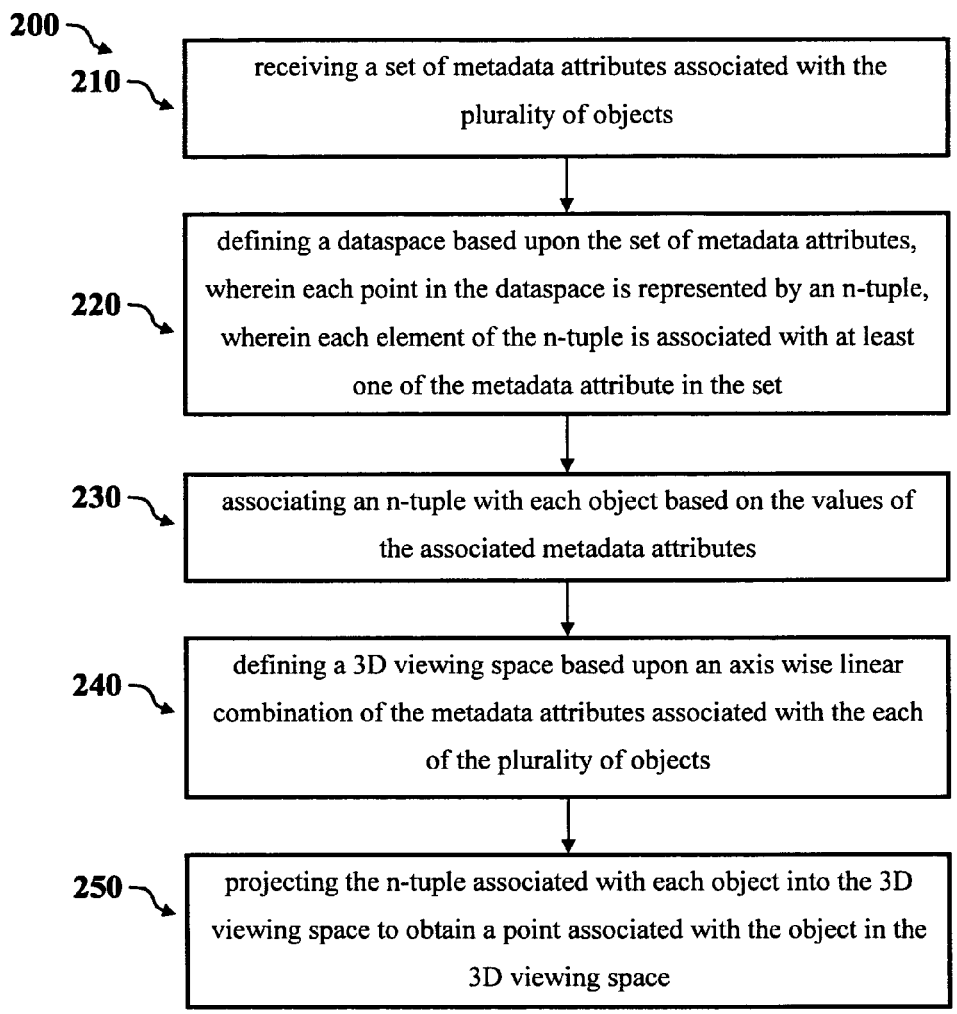
FIG. 2 is a flowchart of a method 200 for associating a point in the 3D viewing space according to an embodiment of the invention.

As outlined above, a point in the 3D viewing space is associated with an object based upon the metadata attributes associated with the object. FIG. 2 illustrates a 200 method for associating a point in the 3D viewing space according to an embodiment of the invention. At step 210 a set of metadata attributes are received for the plurality of objects. The received metadata attributes of the objects are used to define a multi-dimensional space (data space) within which objects can be located, and which will be projected into the 3D viewing space. The set of received metadata attributes represent those attributes from amongst all possible metadata attributes which will be used to distinguish the objects. The received metadata attributes to be used may be a default set or a predefined set based upon the specific application, or may be obtained from a user using an associated user interface (i.e. selected by a user). For example a user may be looking for a specific file which they remember some property of and thus may select colour, brightness and creation date as attributes to be used as the basis for displaying the files (objects).

At step 220, the received set of metadata attributes are used to define a data space. Each point in the data space is represented by an n-tuple, or n length vector, in which each element of the n-tuple, or dimension of the data space, is associated with at least one of the meta data attributes. A single metadata attribute may be as an element of the n-tuple, or a combination of metadata attributes may be used such as a weighted combination of Red, Green and Blue pixel values. Having defined the data space, at step 230 an n-tuple is associated with each object based upon the values of associated metadata attribute. That is each metadata attribute or parameter (type) can be considered to define a dimension in this multi-dimensional data space and thus the n-tuple defines a particular object's location (i.e. a point) in this multidimensional data space. The value of each element is based upon the value of the parameter associated with the object in the range of all parameter values associated with the plurality of objects.

As the objects are to be displayed in a 3D viewing space, typically at least three metadata attributes will be used to define the data space. If however only two were provided or chosen by the user, one of the parameters could be replicated, or the two could be combined so that there were three metadata parameters which could each be associated with a dimension in the viewing space to provide the required third dimension.

If the metadata attribute, which will also be referred to as a parameter is a numerical parameter (i.e. can take any value between a range of values) then the numerical value of the parameter for that object may be used as the value of the associated element in the n-tuple. If however the parameter is a categorical parameter, that is one in which the values are chosen from a plurality of categories (e.g. file types, filenames, months, etc) then value of the parameter for that object may be based upon the rank or order of the specific category according to some predefined ordering criteria. In some cases there may be a preferred (standard) order that can be used to sort the range of values of the parameter (e.g. order of months for months, alphabetical order for filenames), but in other cases an arbitrary order may be used (e.g. [House, Apartment, Townhouse, Unit, Empty Land] for a property, or [Red, Green, Blue] for colour, or [Apple, Orange, Banana] for fruit). For example to determine the value of a categorical parameter, the list of objects could be ordered to obtain an ordered list of objects according to a certain criteria applied to the parameter. The rank of an object, that is the index of the object in this ordered list of objects, could then be used as the value of the associated element in the n-tuple for that object.

As an example consider an image file having 4 associated metadata parameters defined as the average Red, average Green, and average Blue pixel values, and the average brightness of the pixels in the image. A 4-tuple can then be defined as (Red, Green, Blue, Brightness) using each of the metadata parameters as an element or dimension in the 4-tuple. An example of 4-tuples for 6 objects is shown in Table 1 for six n-tuples I1, I2; I3, I4, I5 and I6, with each element, or dimension, of the n-tuple listed in adjacent columns (e.g. I1 can be described by the 4-tuple (16, 32, 48, 32)).

TABLE 1

Metadata for 6 objects

| Point | Metadata | | | |
|---|---|---|---|---|
| | Red | Green | Blue | Brightness |
| I1 | 16 | 32 | 48 | 32 |
| I2 | 80 | 96 | 112 | 96 |
| I3 | 16 | 128 | 32 | 58.67 |
| I4 | 48 | 96 | 64 | 69.33 |
| I5 | 16 | 80 | 32 | 42.67 |
| I6 | 48 | 112 | 64 | 74.67 |

The parameter values may be scaled onto a [0, 1] range by using the numerical value (or rank) of the parameter for that object minus the minimum numerical value of the parameter for the plurality of objects divided by the range of numerical values for the plurality of objects. i.e.

$$\text{scaled value}(\text{object}_{ij}) = (\text{value}_{ij} - \min_i)/(\max_i - \min_i)$$

where the subscript i denotes the $i^{th}$ metadata parameter and j denotes the $j^{th}$ object in the collection (i.e. the plurality of objects to be displayed) and $\text{value}_{ij}$ is the value of parameter i for object j. In the case of a categorical category, the formula simplifies to $$\text{scaled value}(\text{object}_{ij}) = \text{rank}_{ij}/\text{Number of objects in the collection}$$

where $\text{rank}_{ij}$ is the rank (i.e. index in the ordered list of objects) of object j for parameter i.

Often different parameters will have very different ranges and thus scaling, or normalisation may be used to ensure a common scale to make subsequent operations easier or more efficient (since the scale is known). Also placing all parameters on the same scale enables placing the objects in a cube of known dimension which may be visually advantageous when viewing the collection of objects.

As each of the parameters defining the dimensions is sorted, then visualisation of the objects in the multidimensional space will allow objects in the collection to be distinguished, and thus enable identification of the desired object. The choice of metadata parameters may be selected by the user based on their (imperfect) recollection of the desired object. For example if they remember that the object was predominantly bright red, they would select a parameter such as colour and brightness since the image could be distinguished or identified on the basis of a large average red content value and brightness.

Having determined the metadata attributes or parameters to be used as elements of the n-tuple (or dimensions in the data space), and having created an n-tuple for each object in the collection, the next step 340 is define the 3D viewing space based upon an axis wise linear combination of the metadata attributes, and then at step 350 to project the n-tuple associated with each object into the 3D viewing space to obtain a point associated with the object in the 3D viewing space so as to allow viewing of the collection of objects via the projection of their n-tuples into the 3 dimensional (3D) viewing space. In the case of a 3-tuple, each dimension can be used to define a dimension in the 3D viewing space using a 1:1 mapping. However in many cases there will be more than 3 metadata parameters that the user wishes to use to distinguish objects in the collection of objects (and thus enable identification of the desired object) and more complex projections may be used.

The projected point is the (X,Y,Z) point of the object in the 3D viewing space (where X, Y, and Z represent the orthonormal basis vectors defining the viewing space, with X being to the right, Y being vertical and Z being out of the page) that will be presented to the user to view the collection of objects (or visual representations of).

Various techniques may be used to project or transform the n-tuples into the 3D viewing space. In one embodiment projecting comprises associating a unit length projection vector in the 3D viewing space with each dimension of the n-tuple such that each unit length projection vector begins at the origin of the 3D viewing space. These unit length projection vectors can be visualised as radii distributed on the unit sphere. These unit length projection vectors will be designated $A_k$ where k=1 . . . n, and each vector can be represented as $A_k=(A_{kX}, A_{kY}, A_{kZ})$ where $\|A_k\|=1$. The n-tuple can then each be projected into the 3D viewing space using the vector associated with each dimension of the n-tuple. For example consider a 4-tuple defined as $(n_1, n_2, n_3, n_4)$. The projection of this n-tuple to a point p(x, y, z) in the 3D viewing space is then given by:

$$p(x,y,z)=(A_{1x}n_1+A_{2x}n_2+A_{3x}n_3+A_{4x}n_4, A_{1y}n_1+A_{2y}n_2+A_{3y}n_3+A_{4y}n_4, A_{1z}n_1+A_{2z}n_2+A_{3z}n_3+A_{4z}n_4).$$

In this way a point p in the 3D viewing space is associated with each object by projecting each n-tuple using the vector associated with each dimension of the n-tuple. It is also worth noting that the order of the data along each axis is unaffected by this transformation, as each n-tuple is treated equivalently by the projection (or transformation) operation and thus projection of the objects could be done in any order. However whilst the order is maintained, the axes in the viewing space may not necessarily be on the same scale. Thus in one embodiment each of the 3 axes may be separately scaled so that all points are in the range [0, 1] (i.e. located within a cube of unit dimension). Further by scaling each axis separately the pre-scaling order along the axis is preserved.

With n>3 the projection vectors $A_k$ are not all orthogonal in 3D space. That is the dot product $A_i*A_j$, is non zero for at least one pair, and possibly for all pairs of vectors. This may lead to clusters or non uniform spacing in the 3 dimensions of the viewing space which make it difficult to view objects in the collection. Such effects become more likely as N increases as it becomes more difficult to pack many dimensions into the available 3 dimensions. In order to reduce or minimise this effect the projection vectors $A_k$ can be chosen in a way that maximises the angle between them. For example in the case of 4 projection vectors, a tetrahedral arrangement can be used with one vector aligned along the vertical Y axis and distribute the remaining vectors so that all pairs of vectors have a 120° angle to them. Alternatively one could place the first two projection vectors along the X and Y axis, and place the two remaining projection vectors $(A_3, A_4)$ in the plane of the X axis (i.e. Y=0). These can then be chosen to have an equal angular distance to the projection vector on the X axis.

Figure 3:
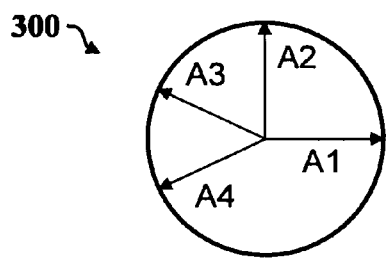
FIG. 3 is a graphical representation of data space dimensions distributed on a unit sphere.

Table 2 illustrates an example of the projection or transformation of set of 4-tuples into 3D space according to an embodiment of the present invention. The projection vectors are defined as $A_1=[1, 0, 0], A_2=[0, 1, 0]), A_3=[-0.6, 0, 0.8]$ and $A_4=[-0.6, 0, -0.8])$ in the 3D viewing space. Thus $A_2$ is orthogonal to each of $A_1$, $A_3$ and $A_4$, but none of these are orthogonal (90°) to each other, with the angle between $A_3$ and $A_4$ being 106° and the angle between both of $A_3$ and $A_4$ with $A_1$ being 136°. This is represented graphically on the unit sphere in FIG. 3.

Table 2 shows the projection and scaling (normalisation) of six n-tuples I1 to I6 using the projection vectors $A_1$ to $A_4$. Firstly the meta data is mapped to 3D (X, Y, Z) space. For example I1 is transformed from (16, 32, 48, 32) to (16*1+ 32*0+48*-0.6+32*-0.6, 16*0+32+1+48*0+32*0, 16*0+32*0+48*0.8+32*-0.8)=(-32, 32, 12.8). Similar transformations or projections are applied to I2 to I6. The projected points are then resealed in each axis. For I1 to I6, the minimum X, Y and Z values are (-44.8, 32, -21.33) and the maximum X, Y, Z values are (-28.8, 112, 12.8). These are then used to rescale each projected point according to (value-min)/(max-min). Thus for I1, this is ((-32--44.8)/(-22.8-- 44.8), (32-32)/(112-32), (12.8--21.33)/(12.8--21.33))=(0.8, 0, 1).

TABLE 2

Projection of 4D data space coordinates into 3D viewing space coordinates

| | Meta Data | | | | 4D coordinates mapped to 3D space using A1 ... A4 | | | Rescaled | | |
|---|---|---|---|---|---|---|---|---|---|---|
| | Red | Green | Blue | Brightness | X | Y | Z | X | Y | Z |
| I1 | 16 | 32 | 48 | 32 | -32 | 32 | 12.8 | 0.800 | 0.000 | 1.000 |
| I2 | 80 | 96 | 112 | 96 | -44.8 | 96 | 12.8 | 0.000 | 0.667 | 1.000 |
| I3 | 16 | 128 | 32 | 58.67 | -38.4 | 128 | -21.3 | 0.400 | 1.000 | 0.000 |
| I4 | 48 | 96 | 64 | 69.33 | -32 | 96 | -4.36 | 0.800 | 0.667 | 0.500 |
| I5 | 16 | 80 | 32 | 42.67 | -28.8 | 80 | -8.53 | 1.000 | 0.500 | 0.375 |
| I6 | 48 | 112 | 64 | 74.67 | -35.2 | 112 | -8.53 | 0.600 | 0.833 | 0.375 |

It will be understood that alternative projection methods could be used. In one embodiment this could comprise taking a 4-tuple $(n_1, n_2, n_3, n_4)$ and projecting into 3D using the diagonal vector (1,1,1) as a pseudo axis. In this approach the first three dimensions are used to define dimensions of 3D cube $(n_1, n_2, n_3)$. This cube is then rotated and translated so that the cube is standing on the (0, 0, 0) corner, with the (1, 1, 1) corner directly above. This can be achieved with a projection matrix in which the new point p is obtained using a transformation matrix as follows:

$$p = (x, y, z) = (n_1, n_2, n_3) \times \begin{bmatrix} \frac{1}{\sqrt{2}} & -\frac{1}{\sqrt{2}} & 0 \\ \frac{1}{2} & \frac{1}{2} & \frac{1}{\sqrt{2}} \\ -\frac{1}{2} & -\frac{1}{2} & \frac{1}{\sqrt{2}} \end{bmatrix}.$$

Next, the point is flattened on the vertical Y Axis by setting they component to zero, and this is then raised by the fourth (remaining) dimension of the n-tuple to give a transformed point p':

$$p' = (x', y', z') = \left(\frac{1}{\sqrt{2}}n_1 + \frac{1}{2}n_2 - \frac{1}{2}n_3, n_4, \frac{1}{\sqrt{2}}n_2 + \frac{1}{\sqrt{2}}n_3\right).$$

The transformed point p' can be scaled as required.

After projection of the points into the 3D viewing space, the collection of points will frequently be clumped in a single large cluster containing most of the data or include a number of clusters, or there may be some points which are located at a large distance from other points which then leads to large voids and clustering of the remaining points. That is the distribution of points after projection, whilst reflecting the ordering of the objects, is often far from uniform. Such effects make it difficult to view the entire collection of objects, or to distinguish between objects and thus identify a desired object in the collection. That is, whilst the natural scale is the true scale, and thus preserves information about the relationship between objects in the collection, it is often a poor scale for visualisation, since this truthfulness often hinders visualising, navigation or identification of specific objects in the collection. Thus as described above a declustering (or redistribution, or void reduction) operation is performed on the data to improve the visual representation of the points in the 3D viewing space, and to facilitate navigation and visualisation of the entire collection. It effectively preserves the structural relationship between the data objects while improving or optimising the viewing volume. For convenience this adjustment operation will be referred to as declustering. However it is to be understood that strictly adjustment of the data is only required to assist in visualising the data and that this adjustment does not necessarily result in full declustering of the data. This operation is performed in such a way as to maintain the relative order of the points so as to preserve at least some of the underlying relationship between the points. This relative ordering may be with respect to all the dimensions simultaneously, or it may be done by maintaining the relative per axis order of the points for each axis of the 3D viewing space. In one embodiment this declustering places the objects at regular grid points effectively cubefying the collection of points so that they have a more regular distribution in the viewing space, and have reduced clustering compared to the original distribution.

When viewing the points along an axis this declustering reduces the variation in spacing between adjacent points so that the distribution of points along each axis is substantially uniformly spaced, and thus the presence of clusters, clumps or voids is reduced. Note that in this context adjacency is with respect to the declustered axis and not adjacency in 3D space. That is, adjacency is with respect to the points whose component values for the declustered axis which are adjacent are not necessarily adjacent in the 3D viewing space. The advantage of this approach is that it is both scalable and computationally efficient as the number of objects in the collection increases whilst maintaining the order of the points along the axis and producing cube like displays which more optimally allow viewing of the objects in the 3D viewing space.

In one embodiment, a sorted list of x axis values for the collection of points is obtained. Then for each point in the list, the distance to the next point is calculated. The mean (or median) separation value is determined, and each separation distance associated with a point is adjusted towards the mean value or in an alternative embodiment set to the mean value. The adjusted x values are calculated by starting at the first point in the list and adding the adjusted separation distance to obtain the location of the next point. Then, this point's adjusted separation distance could be used to obtain the location of the next point. This process could then be repeated for all points (and then for the other two axes).

Adjusting of the separation could be done on statistical basis such as using the standard deviation or Inter-Quartile Range (IQR) of separation distances. This could be predetermined during configuration of the application or be set by a user. This could be calculated along with the mean, and a maximum separation distance could be set. For example any separation distance more than 1 standard deviation from the mean could be pulled back to this limit. Alternatively the median and Inter-quartile range, or other robust location (central tendency) and variance estimators could be substituted for the mean and standard deviation. Rather than use a fixed limit, a variable scaling factor could be applied where the adjustment applied is larger for points further from the mean (or median). As points in clusters will tend to have smaller separation distances then use of the average separation distance will space a cluster out. Similarly if two points are sparsely separated this approach will bring them closer together.

An example of declustering points along the X-axis according to an embodiment of the present invention is presented in Table 3. The points are first resealed so that all points are distributed within an S×S×S cube. S may be predefined, obtained from user input, or from a scaling function $S = c\sqrt{N}+ = N^{1/c} +M$ where C is representative of typical clustering and may be empirically determined for the expected data size, and M sets a lower limit on the size of S. Using a range of datasets of different sizes, values in the range [1, 3.5] were found to be suitable. For a given number of points N, C effectively controls the size and density of points in the cube. For example with 10000 points a value of C=2 places the points on cube roughly 200 units, whereas if C is 3 this places the points on a cube of roughly 21 units. M is in the range [0, 0.1] and sets a lower size limit. The value of C may be determined based upon test data, determined at run time by estimating the amount of clustering present or the value may be user selected via the user interface. For example one embodiment tested used a value of C=2 and M=0, and another embodiment used a value of C=3.4 and M=0.1.

Once the points have been resealed to an S×S×S cube the points are separately adjusted or declustered along each axis. That is the first axis is selected and adjustment (or declustering) is performed on the co-ordinate associated with that axis. Then the second axis is selected and the co-ordinate associated with that axis adjusted. Then the final (third axis) is selected and the co-ordinate associated with that axis adjusted. Following declustering the adjusted points may be resealed to space out (or in) the separation between all points using a post adjustment scaling factor.

Figure 4:
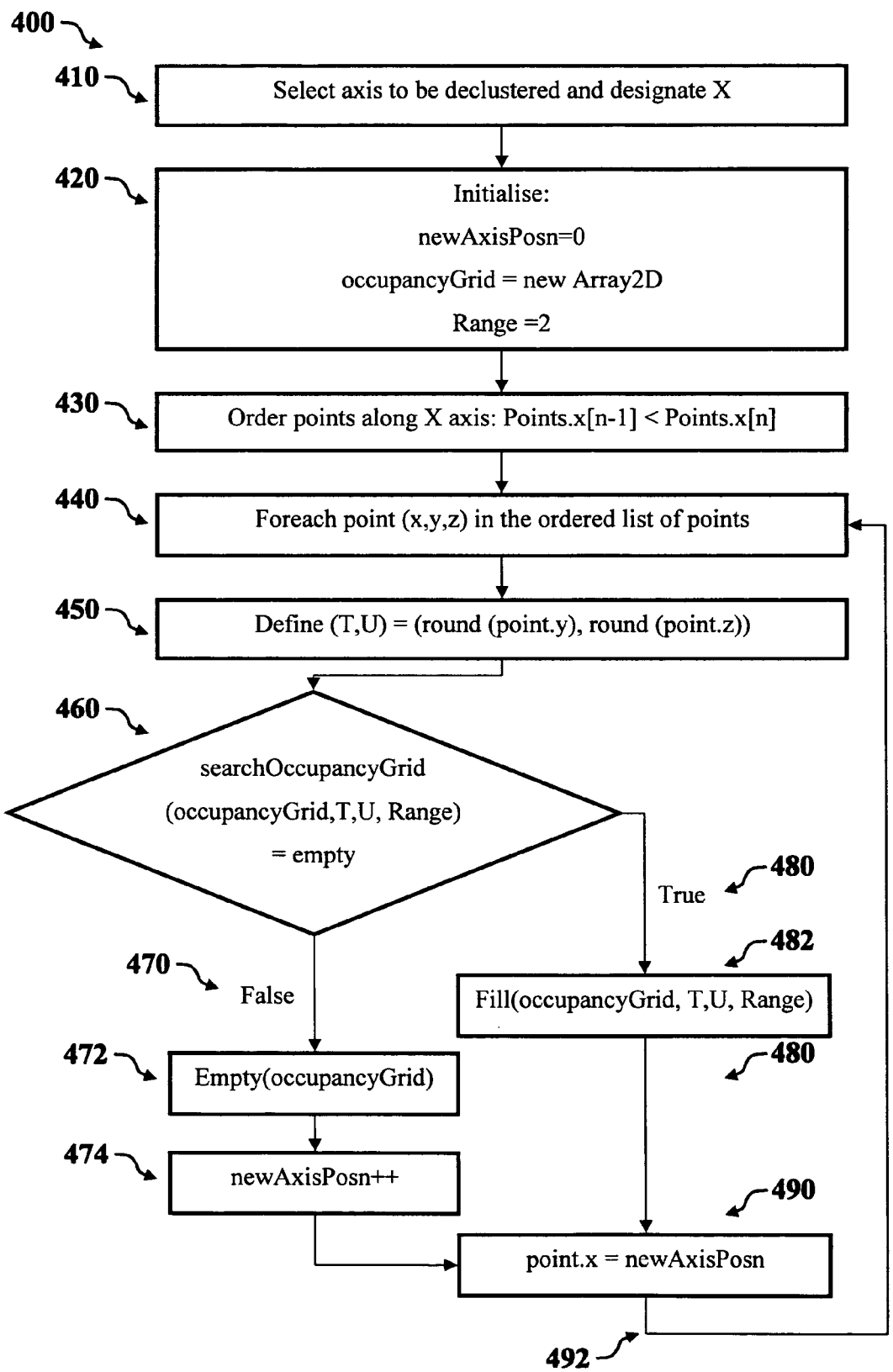
FIG. 4 is a flow chart 400 of a method for declustering points along an axis according to an embodiment of the present invention.

FIG. 4 is a flow chart 400 of a method for declustering points along an axis. The declustering function is called on each axis sequentially such as the X axis (right), then the Y axis (vertical) and then the Z axis out of the page). The axis to be declustered or adjusted is selected 410. For the sake of clarity this is designated to be the X axis. An initialisation step 420 creates an occupancy grid which is a 2D array, a grid clear counter to zero and a search range variable defined as range which in this embodiment is set to 2 units. The dimensions of the occupancy grid correspond to the two other orthogonal dimensions which in this case are Y and Z axes. The occupancy grid is initially empty and as will be discussed below if progressively filled and then cleared or emptied under certain conditions at which point the grid clear counter is incremented.

An ordering step 430 is performed in which the points are ordered along the axis to be declustered. For example, if Points is an array of N points, then after ordering Points.x[n−1]<Points.x[n] (or more generally Points[n−1].Axis<Points[n].Axis where Axis is the Axis vector, eg [1,0,0] for the x axis). At step 440 each point in the ordered list of Points is processed. At step 450 values T and U are defined which correspond to the rounded coordinates of the points for the two other axes orthogonal to the axis being declustered. Thus in this embodiment in which the x axis is being declustered T=round(point.y) and U=round(point.z). A search step 460 is performed to determine if there is an empty cell in the occupancy grid centred on T and U, and a search range (in this case 2 units). If the search returns True (480) then an empty cell exists either at the point (T, U) or at a nearby point, in which case the respective point in the occupancy grid is filled 482, or marked as occupied. If however the search returned a false result (470) then the occupancy Grid is emptied 472, and the grid clear counter is incremented by 1 unit.

Finally the adjusted value of the point is set to the current value of the grid clear counter at step 490 and then the process is performed for the next point in the ordered list (arrow 492) until all points have been processed.

Various search ranges and search algorithms may be used. A search range of 2 was generally found to provide good results, although the search range could be set by the user allowing them greater control over the declustering process. In one embodiment the search is performed by starting to the right of the occupied cell (T,U), and testing each cell surrounding the cell in a counter clockwise direction. This could be done by searching the inner ring first before proceeding to the outer ring of cells. Alternatively the search space could be determined by a distance (e.g. 2 units). The size of the search space could be varied to affect the amount of declustering performed. For example, if a large search space is provided, there will be relatively fewer grid reclears and points will be more closely spaced. If the search space is small then there will be more grid reclears, and thus greater spacing between points. The user may be provided with a control or input to control the amount of declustering by a combination of the scaling factor S and the size of the grid search space. Additionally or alternatively, the user may be allowed to adjust the inter point spacing by applying a post adjustment scaling factor to all points.

In one embodiment values of C and M of 2 and 0 were used with a grid search size of 2 cells around the occupied cell, and in an alternative embodiment values of C and M of 3.4 and 0.1 were used with a grid search size of 2 cells. It was found that these combinations produced cubic datasets with reduced clustering (compared to the pre declustering arrangement). In general it was found that as the number of objects increased that lower values of C tended to produce more cubic looking displays after the adjustment operation described herein. Using larger values of C (i.e. more than 3.5) tended to lead to disorder as the points were forced into a smaller volume (for example red objects moved into the blue zone). Generally the points were most spread out in the direction of the last axis declustered.

An example of declustering is provided in Tables 3 to 5 using the scaled locations of the 6 points I1 to I6 shown in Table 2, along with an additional 4 points (I7 to I10). A search space comprising the single ring of cells surrounding the occupied cell is used. Firstly the 10 points are scaled to a cube of size 2×2×2 using the above scaling function with C=2.792 and M=0.1. The X axis values of the scaled points were then sorted giving a new point ordering of I2, I3, I6, I1, I4, I5, I7, I8, I9, and I10 listed in the right hand column of Table 3.

Table 4 illustrates the grid searching. The (Y, Z) coordinates are mapped to (T, U) coordinates by rounding the Y and Z coordinates. The first point I2 has (Y, Z) coordinates of (1.33, 2.00) which maps to (T, U) coordinates of (1, 2). The grid cell corresponding to this point is empty so I2 is placed on the grid. Next point I3 is considered, and as (T, U) coordinates of (2, 0) are empty, this point is placed on the grid. Similarly points I6, I1, and I4 are placed at grid cells (2, 1), (0, 2) and (1, 1). Next point I5 is considered. The (Y, Z) coordinates of (1.0, 0.75) map to (T, U) coordinates of (1, 1). However I5 cannot be placed at (1, 1) as it is already occupied by I4. A search for an unoccupied cell is initiated and the cell at (2, 1) is first considered. However this cell is occupied by I6. The search then proceeds in a counter clockwise manner and the cell at (2, 2) is checked.

TABLE 3

X axis based ordering of sample points to be declustered

| | Original Coordinates | | | Scale to S × S × S cube S = 2  C = 2.792  M = 0.1 | | | Sorted Order | |
|---|---|---|---|---|---|---|---|---|
| Point | X | Y | Z | X | Y | Z | Point | X |
| I1 | 0.80 | 0.00 | 1.00 | 1.60 | 0.00 | 2.00 | I2 | 0.00 |
| I2 | 0.00 | 0.67 | 1.00 | 0.00 | 1.33 | 2.00 | I3 | 0.80 |
| I3 | 0.40 | 1.00 | 0.00 | 0.80 | 2.00 | 0.00 | I6 | 1.20 |
| I4 | 0.80 | 0.67 | 0.50 | 1.60 | 1.33 | 1.00 | I1 | 1.60 |
| I5 | 1.00 | 0.50 | 0.38 | 2.00 | 1.00 | 0.75 | I4 | 1.60 |
| I6 | 0.60 | 0.83 | 0.38 | 1.20 | 1.67 | 0.75 | I5 | 2.00 |
| I7 | 1.00 | 0.10 | 0.20 | 2.00 | 0.20 | 0.40 | I7 | 2.00 |
| I8 | 1.00 | 0.00 | 0.70 | 2.00 | 0.00 | 1.40 | I8 | 2.00 |
| I9 | 1.00 | 0.60 | 0.23 | 2.00 | 1.20 | 0.45 | I9 | 2.00 |
| I10 | 1.00 | 0.55 | 0.48 | 2.00 | 1.10 | 0.95 | I10 | 2.00 |

TABLE 4

Example of Grid Searching

| | T | U | Occupied | Grid Clear Counter | New T | New U |
|---|---|---|---|---|---|---|
| I2 | 1 | 2 | No | 0 | 1 | 2 |
| I3 | 2 | 0 | No | 0 | 2 | 0 |
| I6 | 2 | 1 | No | 0 | 2 | 1 |
| I1 | 0 | 2 | No | 0 | 0 | 2 |
| I4 | 1 | 1 | No | 0 | 1 | 1 |
| I5 | 1 | 1 | Yes | 0 | 2 | 2 |
| I7 | 0 | 0 | No | 0 | 0 | 0 |
| I8 | 0 | 1 | No | 0 | 0 | 1 |
| I9 | 1 | 0 | No | 0 | 1 | 0 |
| I10 | 1 | 1 | Yes | 1 | 1 | 1 |

TABLE 5

Representation of grid and adjusted X values of points

| Occupancy Grid | U | 2 | I1 | I2 | I5 |
|---|---|---|---|---|---|
| Grid Clear | | 1 | I8 | I4 | I6 |
| Counter = 0 | | 0 | I7 | I9 | I3 |
| | | | 0 | 1 | 2 |
| | | | | T | |
| Occupancy Grid | U | 2 | | | |
| Grid Clear | | 1 | | I10 | |
| Counter = 0 | | 0 | | | |
| | | | 0 | 1 | 2 |
| | | | | T | |

TABLE 5-continued

Representation of grid and adjusted X values of points

| Point | Adjusted X |
|---|---|
| I1 | 0 |
| I2 | 0 |
| I3 | 0 |
| I4 | 0 |
| I5 | 0 |
| I6 | 0 |
| I7 | 0 |
| I8 | 0 |
| I9 | 0 |
| I10 | 1 |

This cell is empty (unoccupied) so I5 is assigned new (T, U) coordinates of (2, 2) and this cell is marked occupied. As a cell was found within the search space no grid reclearing operation was necessary. Next points I7, I8 and I9 are each placed in (empty) cells (0, 0), (0, 1) and (1, 0). Finally point I10 is considered having (T, U) values of (1, 1). However this cell location is already occupied by I4 as shown in Table 5. Thus a search is performed of the surrounding cells, but all cells are found to be occupied (I6, I5, I2, I1, I8, I7, I9, I3). Accordingly the grid is then cleared, and the grid clear counter incremented to 1. Then I10 is placed at the now unoccupied grid location of (1, 1). Thus after declustering the x axis, the x values for I1 to I9 is each zero, and for I10 it is 1 (see last column of Table 5).

The Y and Z axes are then separately declustered after the X axis declustering. Declustering of the Y (or Z) axis may then proceed using either the declustered X axis but original Y and Z (i.e. not the T and U values), or even the original point distribution (i.e. prior to declustering the X axis).

In one embodiment in which the Y axis represents the vertical axis (X being to the left, and Z out of the screen), the X axis is first declustered. The Z axis is then declustered using the declustered X positions. Finally the Y axis is declustered using the declustered X and Z values. In this case the points are all adjusted to have integer values. In this embodiment the last axis to be declustered (Y) experiences the largest change in size (stretching along that axis). Further in this embodiment the points will be adjusted to be at integer values along each axis. In an optimal case, a point would be surrounded by 6 other points, each exactly one unit away, and this would provide an optimum packing arrangement. However with most datasets this optimum configuration will not eventuate, and instead there will be empty cells distributed throughout the cube.

In the present case the number of objects to decluster was small (10) and thus most points could be placed at the start of the x axis. However as the number of objects in the collection is large (e.g. N>100), the declustering performance of the above algorithm increases and further it is computationally efficient and scalable. This is because once the points are sorted, one needs only to create a counter and a comparatively small grid (e.g. (S+4)×(S+4) using a search size of 2 cells) thus enabling quick searching of the grid. Also as each axis is declustered separately, points with the same x value (i.e. same rank) are unlikely to have the same y and z values, so they will be distributed on those axes. This is an effect which increases as N increases.

Figure 5:
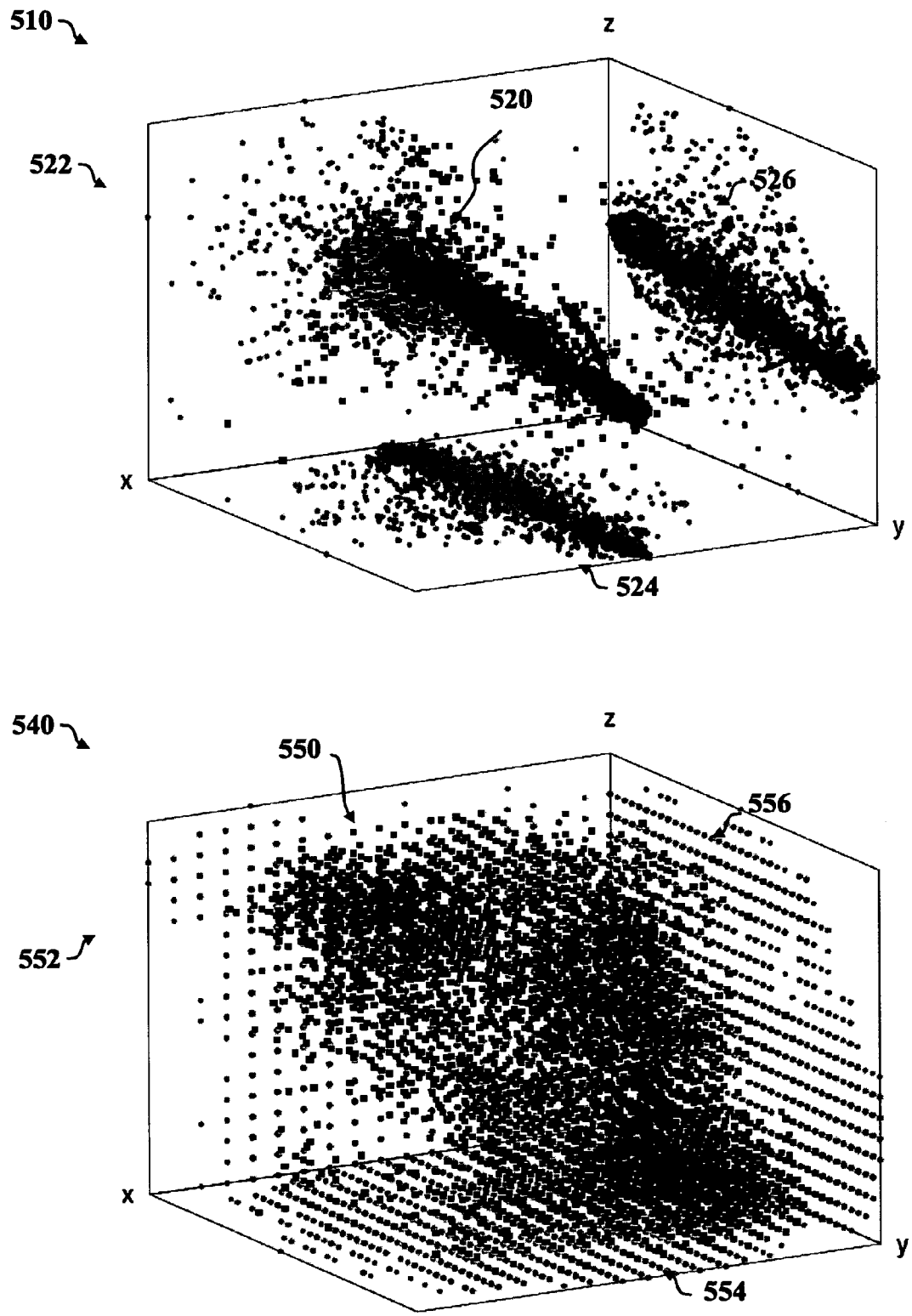
FIG. 5 is an illustration of a collection of points before and after declustering according to an embodiment of the present invention.

A further example of declustering on approximately 3500 points is shown in FIG. 5. A 3D plot 510 of the collection of points is shown after projection of the points into a 3D viewing space. The projected points 520 are highly clustered, having a central cigar shaped distribution with outliers. The respective X 522, Y, 524 and Z 526 of the points are shown as grey points on the walls of the cube forming the 3D plot 510. These points were declustered using the above described method, and a plot 540 of the adjusted points 550 is shown below the unadjusted points for comparison. The respective X 552, Y, 554 and Z 556 of the adjusted points are shown as grey points on the walls of the cube forming the 3D plot 540. From comparison of plots 510 and 540 it can be seen that this adjustment has reduced the clustering and more regularly spaced the points within the 3D viewing space, allowing for improved visualisation of the entire dataset.

In an alternate embodiment, declustering can be performed in 3D space, rather than along each axis independently. In this embodiment clusters and regions of lower density or voids in 3D space are first identified. For example the Euclidean distance to other points can be determined and used to and produce a distance matrix which could then be used by cluster analysis algorithms (e.g. UPGMA, k-means, QT-clustering, spectral clustering, Self Organising Maps, etc) to identify clusters. Points can then be adjusted to decluster the points in 3 dimensions, such as by identifying the direction of lower density regions or voids from a cluster and adjusting points in the direction of these regions. Physics based approaches using springs or distance based force fields may be used in which repulsion forces are strongest at short distances such as a $1/R^2$ dependence, or more generally $1/R^n$ where $n>1$ and where n may be determined during configuration of the application or by user selection using a user interface. This may be performed in such a way as to preserve the ordering of points along each axes (which may add additional computational complexity to the task), or this restriction may be relaxed provided the structural relationship between the objects in the cluster is substantially preserved (ie minor rearrangements are allowable).

Figure 6:
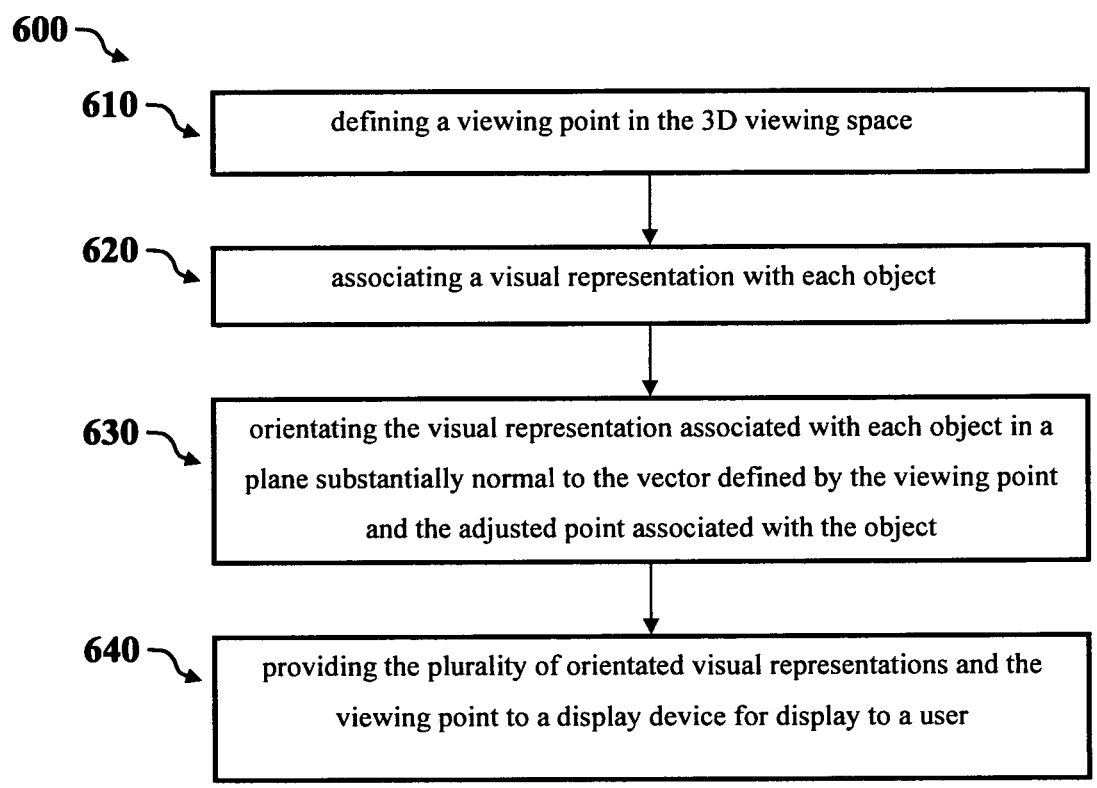
FIG. 6 is a flowchart of a method of providing the adjusted points to a display device according to an embodiment of the present invention.

The step of providing the adjusted points to a display device is further illustrated in FIG. 6. The first step 610 includes defining a viewing point in the 3D viewing space. This can be considered to the location of a camera which views the 3D space. The next step 620 includes associating a visual representation with each object. This may be an image or icon provided by the operating system or a predefined image or thumbnail may be associated with each object or generated by the operating system or other application. At step 630, the visual representation is orientated so that it is a plane substantially normal to the vector defined by the viewing point and the adjusted point associated with the object. This ensures the image will be facing the camera (and thus the user). At step 640 the orientated visual representations, adjusted points and the viewing point are then provided to a display device. The user can then view the collection in the 3D viewing space using a conventional 2D display (eg by projection onto a 2D canvas based on the camera location and orientation), or alternatively in a 3D display, using conventional techniques.

The viewing point can be chosen to be a point outside the collection of points, or alternatively it can be located within the collection of points, in which case only a subsection will be in the field of view. The user can select the viewing point, thus allowing them to zoom in or out of the displayed collection of points. Further the user can select any viewing angle, or alternatively select a spin function, which spins the viewing point around the collection of objects (or vice versa). For example if the X axis is directed to the left, the Y axis is directed vertical axis and the Z axis is out of the page, then the camera could be spun around the vertical Y axis. To the user who is fixed at the viewing point, it will be the collection of points that appears to spin. Further by displaying the image in a plane substantially normal to the vector defined by the viewing point and the adjusted point associated with the object, then no matter what the viewing point each image will appear to face to the viewer. As a further step to facilitate looking through the cube of objects, the associated points on each axis may be scaled to increase (or decrease) the gap between points when displayed. This may be performed after adjusting the points on each axis discussed above, or be controlled via a user input. The visual representations or images may also include a transparency setting, so that as a user zooms into the cube and rotates the view (camera) nearby images are made transparent so that images behind the nearby object can be viewed.

Figure 7:
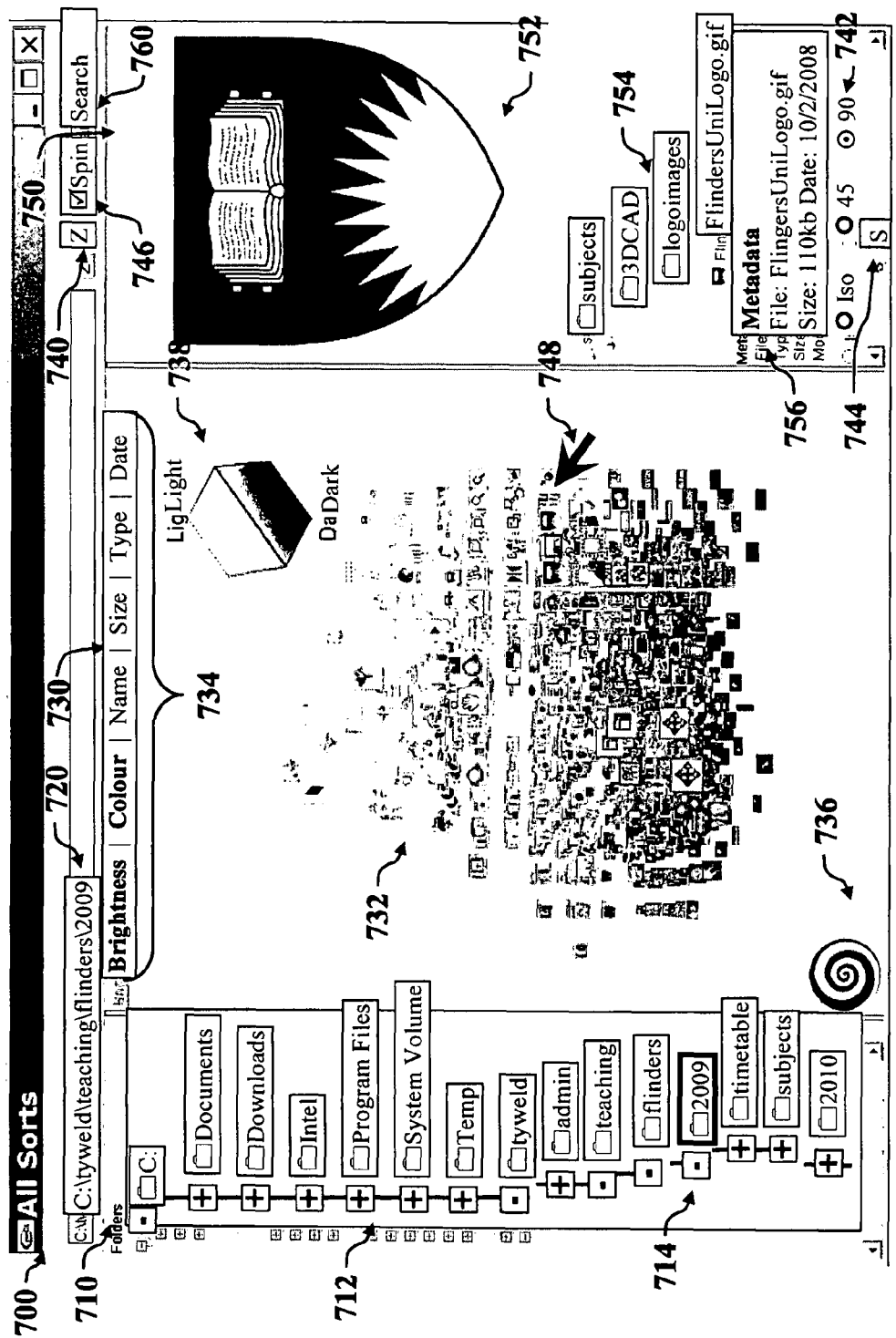
FIG. 7 is a display of the user interface for a computer program product implementing a method for displaying a plurality of objects according to an embodiment of the invention.

FIG. 7 display of the user interface 700 for a computer program product implementing a method for displaying a plurality of objects according to an embodiment of the invention. The user interface allows a user to select objects and the criteria for sorting them, as well as control the view of displayed objects. The user interface may be controlled via a number of selectable inputs (e.g. buttons, checkboxes, sliders, mouse input, keyboard input etc). The user interface allows the user to navigate and explore data, including performing iterative searches or selections. The user may select or view a first collection using a first set of metadata attributes is displayed, and may then choose an alternative (possibly overlapping) set of meta attributes to display the data (resulting in a different distribution). Alternatively they user may select a subset of the initial collection for redisplaying, such as by selecting a volume of the 3D display or selecting specific objects. The user may also zoom in, rotate, and move individual objects in the collection.

The user can select the objects (dataset) which are to be sorted using a tree-view style folder interface 712 in navigation pane 710 shown on the left hand side of FIG. 7. A particular folder ("C:\twyeld\teaching\flinders\2009\") 710 has been selected to be viewed and the full path is shown in the search directory pane 720. In this example this folder, including all subfolders, contains a total of 870 files. An image is associated with each file and the projected and declustered (adjusted) images are displayed as a 3D floating cube 732 or 3D array in the (main) display pane 730 of the user interface (i.e. the 3D viewing space or 3D viewport).

The top bar (row) 734 in the display pane 730 includes the metadata types which can be used to sort the objects to be displayed. For example in this instance the user has selected "Brightness" and "Colour" (which is actually 3 separate metadata attributes or parameters for each of Red Green and Blue pixel colours in the image). The user also can select "Name", "Size", "Type" and "Date". Selection (or de-selection) of metadata or objects triggers resorting, transforming, declustering and display of the images associated with the objects. A loading indicator 736 is displayed in the lower left hand corner of the display pane 730 when the system is performing the required calculations, and may disappear once calculations are complete and the new display is displayed to the user.

The 3D viewport can be zoomed and panned by the user in a manner similar to that used in 3D modelling programs. A navigation aide 738 in the shape of a cube with labels is shown in the top right of the display pane. A user can select and drag this cube around to change the viewing point, or alternatively the user can select and drag at any point in the scene to change the viewing point/angle with this change being reflected in the orientation of the navigation aide. The user can also press a "Z" button 740 to zoom out so that all objects can be seen. Alternatively the user can use a mouse wheel, up and down arrow keys, or "W" and "S" keys to zoom in and out. Movement of the mouse, or pressing left and right arrow keys, or "A" and "D" keys allows sideways.

Radio buttons 742 can be selected to choose different field-of-views FoV (isometric, 45°, 90°). A spacing slider "S" 744 is also provided in the bottom of the rightmost pane for controlling the distance between individual images (i.e. application of a post adjustment scaling factor to all points). This can be configured to control the scaling factor S for the declustering operation performed (i.e. setting the points to be in an S×S×S cube), rather than using the scaling function defined above. Alternatively it may be used to adjust the separation of points after declustering is performed. A spin checkbox 746 is provided to cause the floating cube of displayed images to spin (in effect the viewing point is spinning around the cube, but the cube is always seen from the user's point of view so it is the cube which appears to spin).

The user may use a user input device such as mouse to control a displayed icon 748 which may be used to select and move individual images in the 3D array. That is the user can further adjust the location of an object. In this way as the user identifies objects of interest they can drag them into an empty region of the 3D array, or to an empty region adjacent the display (but still in the 3D viewing space). A results pane 750, shown on the right hand side is used to display a larger version 752 of the selected image along with further information on the selected object (e.g. file location 754 and associated metadata 756). In this case the user has selected an image of the Flinders University crest from the 3D array. In another embodiment upon selection of an individual image the viewport will 'zoom' in, so that the image takes up a majority of the display area.

A search interface 760 is also provided which allows users to specify a search term (word or phrase). This allows the user to filter out or select specific types of objects from the currently displayed set, or alternatively to search for specific objects across multiple locations. All files/objects satisfying the search criteria are located, displayed and sorted. This may be an alternative input to the tree-view style folder interface 712 for selecting or obtaining the objects to be displayed, or may be used in combination with the tree-view style folder interface 712.

Figure 8:
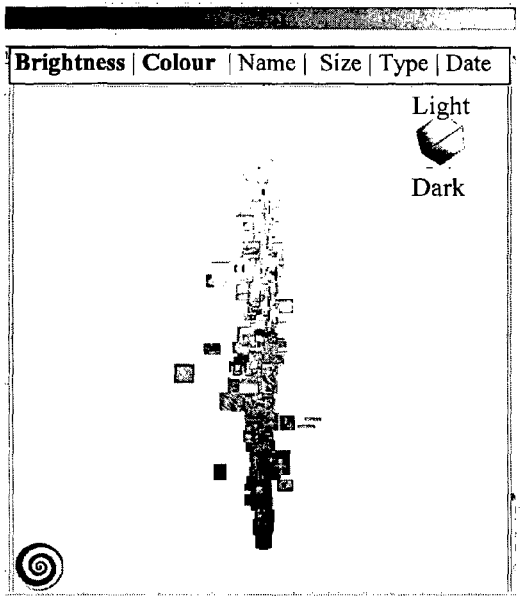
FIG. 8 is an example of a dataset before performing the adjustment step according to an embodiment of the invention.
Figure 9:
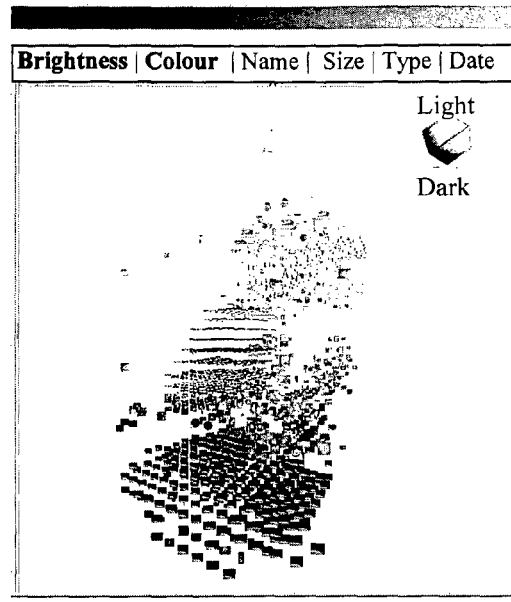
FIG. 9 is an example of the dataset of FIG. 8 after performing the adjustment step according to an embodiment of the invention.
Figure 10:
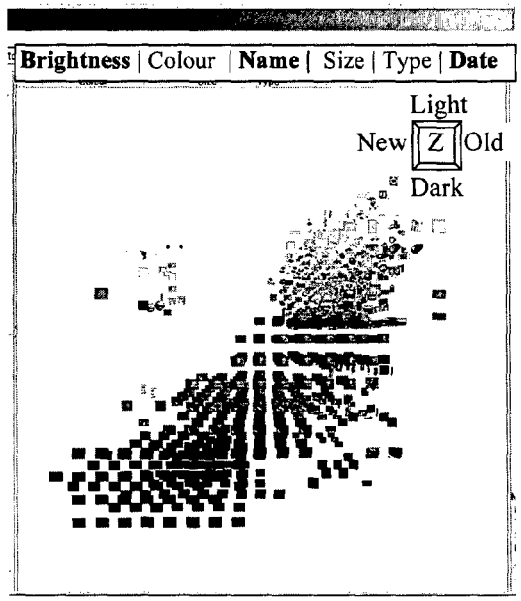
FIG. 10 is an example of one view of a dataset according to an embodiment of the invention.
Figure 11:
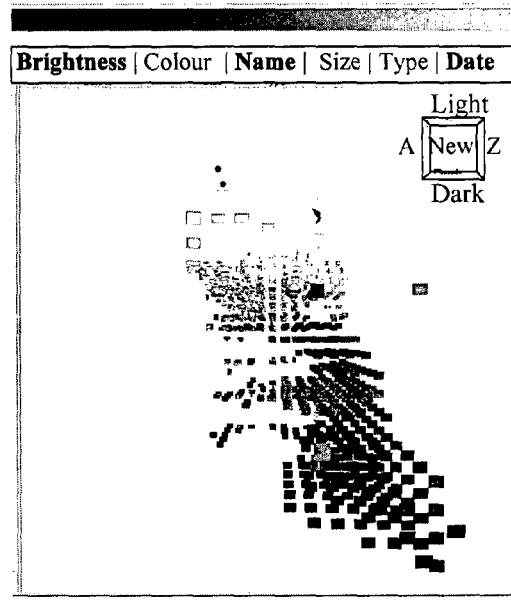
FIG. 11 is an example of the dataset of FIG. 10 rotated 90° counter clockwise about the vertical (Y) axis according to an embodiment of the invention.

FIG. 8 shows an example of a dataset before the adjustment (declustering) step and FIG. 9 shows the same dataset after the adjustment (declustering) step. In FIG. 8 it can be seen that the points are elongated along with the vertical (Y) axis, with little variation in the X or Z directions in the 3D viewing space. In contrast, FIG. 9 shows the same dataset but in this case the adjustment has produced a more cube like distribution of points, and the individual points are considerably easier to distinguish in this view. FIG. 10 shows an example of one view of a dataset, and FIG. 11 shows another view of the same dataset which has been rotated 90° counter clockwise about the vertical (Y) axis.

Figure 12:
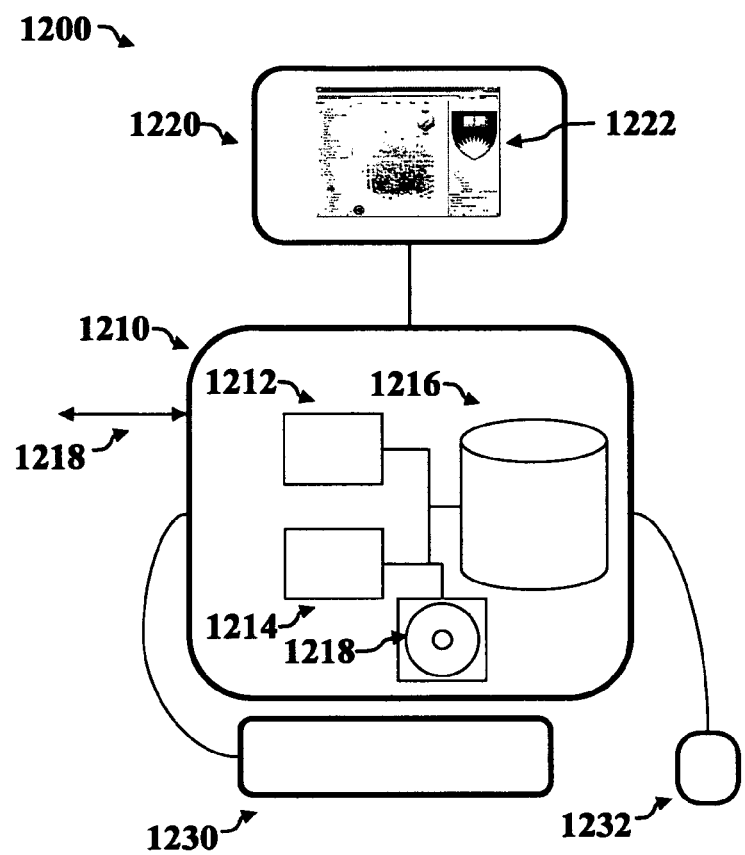
FIG. 12 is an example of a computing apparatus for performing a method according to an embodiment of the invention.

The method described herein may be embodied in computing apparatus or devices, or as a computer program product or in the form of computer readable instructions for execution by a processor or computer. FIG. 12 is an example of a computing apparatus 1200 for performing or executing a method according to an embodiment of the invention. The computing apparatus comprises a computing device 1210 comprising a processor 1212, and memory 1214 and a storage device 1216, each in communication with each other. Instructions (or code) for causing the computer (or processor) to perform the method may be stored on the memory 1214. The instructions may also be stored on a computer readable medium such as a CD, DVD, USB stick (Flash), which may be removable and be inserted into the device. The computing device may be a standalone device, or it may be networked or connected to one or more computers or the internet via communications apparatus 1218. Wired or wireless protocols may be used to facilitate such connections. The computing device is connected to a display device 1220, which may be used to display a plurality of objects to a user 1222 such as that produced according to an embodiment of the invention described herein. The computing device may also include one or more user inputs such as keyboard 1230 and mouse 1232. In some embodiments the display device may include a touch screen and act as a source of user input.

The computing device could be a desktop computer, web server, a laptop, a netbook, a mobile phone or other portable computing device such as personal digital assistant (PDA). The display device, processor, memory and storage device may be provided in a single device, or they may be distributed in multiple devices which are connected or in communication using wired or wireless connections or protocols. The display device could be a conventional 2D screen in which the 3D display (or 3D world space) is further projected onto a 2D canvas (ie flat display) based on the location of the camera, or a three dimensional display device such as holographic display or 3D display screen which may require a user to wear specialised glasses (e.g. polarised or with active shutters) in order to view the three dimensions.

The apparatus or device performing the projection and adjustment steps may be distinct from the apparatus which displays the results to a user. For example a user could be provided with a user interface on their desktop computer or mobile phone and use this to connect or access a webserver eg using standard connection protocols such as HTTP or HTTPS over the interne. A server associated with the website could receive a search criteria (such as set of keywords or a set of metadata attributes) from the user (via the user interface) from the user interface and then perform the search and locate the objects, or the webserver could receive a request for displaying objects in a collection from the user and perform the projection and adjustment steps. The user could use a user interface to manually select objects to be displayed, such as by selecting a directory, or by selecting a subset of the currently displayed collection of objects (e.g. by selecting all objects in a region of the 3D display). Alternatively of additionally they could select which metadata attributes are to be used to display the objects (i.e. which metadata attributes are to be used to define the data space from which the viewing space is based). The locations of the adjusted points and details of the 3D viewing space and camera location could then be provided to the user's desktop or mobile device which handles display of the objects to the user. Thus a system could be provided in which a first computing device is configured to perform the computational processing to determine the adjusted points to be used, and a display device is used to display visual representations. The display device may be a further component of the first computing device or the display device may be a separate device (or part of a separate computing device) which provides a user interface, receives search criteria and displays the results in 3D.

The display method and the search method described herein can be used in a variety of environments and for a variety of datasets or tasks. For example an embodiment of the invention could be used as a local search tool for searching a user's hard disk for a specific file or files. For example a user could be interested in finding a photograph taken in a certain month at a certain location (e.g. the beach) but be unsure of the directory the file was stored in. The user could use an associated user interface to input search criteria relating to the date and visual clues regarding the location (e.g. large amounts of yellow or blue). Such a search would identify a set or collection of images which are then displayed in a 3D format according to the search criteria (e.g. date, and colour attributes such as Red, Green and Blue content). The user could then visually inspect the 3D display and identify the desired image.

In another embodiment the method could be used to identify digital or electronic documents (eg PDF's MS office documents, etc) in an electronic library, archive or database. The operating system or other application may generate a thumbnail image of the document (or the front page of a document) which can be associated and used in the 3D display. Associated metadata can include file metadata (eg creation date, size), thumbnail metadata (colour, objects), location in the database (index, nearby or related documents), and bibliographic details (author, title, date). A user could then search or browse the database and visualise the results using the 3D display to assist in identifying documents or a document of interest.

Alternatively the method could be used to assist in finding documents in a physical library. For example the covers of physical reports could be scanned, and metadata about the physical report (e.g. colour, location on the shelf) along with bibliographic details (author, title, date) stored in a database. Users could then search the library from using a combination of physical and bibliographic terms. For example the user might remember that a particular report was next to a distinctive pink report, so two of the metadata characteristics could be colour and location. The user could then locate the pink report from which they could examine nearby reports based on shelf location, and thus identify the desired report.

In another embodiment the 3D display system may also be used with a system for storing searches and search terms in a metadata database. This is particularly useful when searching for images, or features in images which can be described with a variety of terms. In such cases a poor or narrow choice of a term by a searcher (or classifier) may lead to the searcher missing relevant images.

In this embodiment each object has an associated image and associated metadata stored in the metadata database. The metadata database may be located on a web server, hard drive, or other database, and includes metadata on images (or other files or objects), as well as a reference to the location of the image, which in this embodiment is an image database. The metadata database provides information on the images to extract from an image database and a collection of associated images are retrieved. The user enters one or more first search terms to identify matching images and a primary search set of matching objects is created. One or more additional search terms are then retrieved from the metadata database based upon search terms associated with the objects in the primary search set in the metadata database. A secondary search set of objects is then created by searching the metadata database for objects with metadata matching the additional search terms. The primary search set and the secondary search set can then be combined to create a combined search set of objects. The images associated with the objects in the combined search sets can then be displayed in 3D using an embodiment of one of the methods described herein on a display device to the user. The user may then select one or more images in the 3D display, and can choose to perform further operations such as downloading, moving, copying, editing etc. Further upon selection of an image, the search terms are then associated with the selected or saved images in the metadata database for use in later searches.

The image database may be a local, remote, distributed database. In some embodiments the image database may in fact be built or updated in real time by performing an image search of the internet and then either storing the results locally, or just the link location for later retrieval. The metadata database could also include image analysis routines which scan or process retrieved images and attempt to characterise the images (e.g. RGB, brightness, contrast, Hue, Saturation etc) or identify features in the image (objects, faces, buildings, patterns such as stripes or diagonal lines, geometric shapes such as circles or stars, etc).

In another application the interface and search method could be used as part of a web interface to display search results, or as a web interface to an ecommerce site or online store such as a shopping or real estate site. The objects could be actual products, and an image could be associated with each object. Metadata could include image characteristics (such as Red, Green, Blue, and Brightness) as well as metadata relating to the objects being sold such as price, colour, brand etc. A default collection of objects could be displayed (e.g. all objects for sale according to Red, Green, Blue, and Brightness metadata) or a user could enter desired criteria or search terms which could be used to generate a collection of objects to be displayed using the 3D cube array. Searches could also utilise previous search terms as described above.

Figure 13:
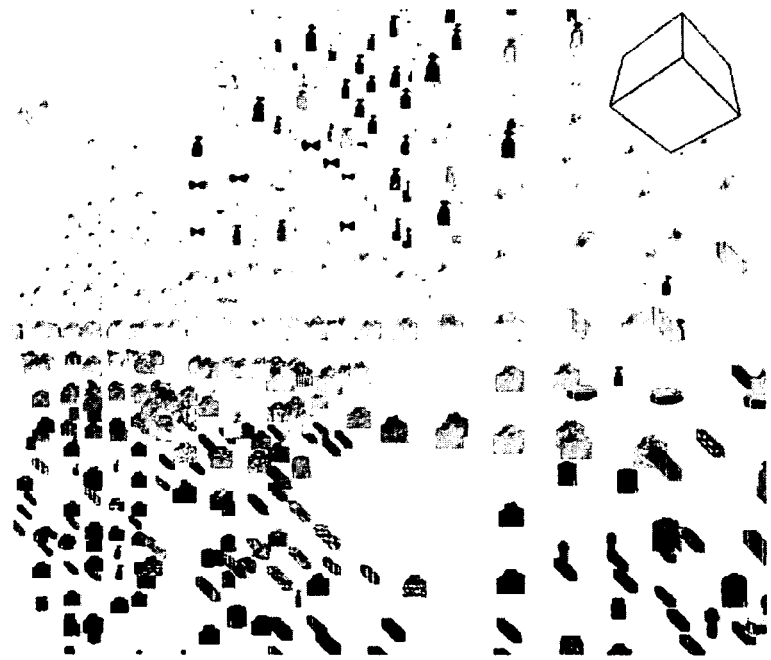
FIG. 13 is an example of a 3D interface for a website according to an embodiment of the invention.

FIG. 13 is an example of an interface for a shopping website according to an embodiment of the invention. The interface allows display and searching of shirts for sale. In this embodiment the object is a shirt which may be purchased and the image displayed is an image of the shirt. The website creator or administrator may define a set of metadata attributes which are associated which each image or size. This may relate to quantities such as size, plain or striped (or density of stripes), and may be determined from the image using an appropriate image analysis tool (eg which searches for vertical lines in an image). On entering the website, the entire collection of shirts could be displayed according to image metadata such as to Red, Green, Blue, and Brightness. A user can then select explore this default collection or select other metadata attributes to use to display the collection of shirts based upon their preference such as light shirts with stripes. Alternatively they could perform a search by entering keywords relating to metadata characteristics (e.g. blue OR stripes) which generates a collection of results which are then displayed. The user can then explore the displayed collection and select objects of interest for purchasing.

Figure 14:
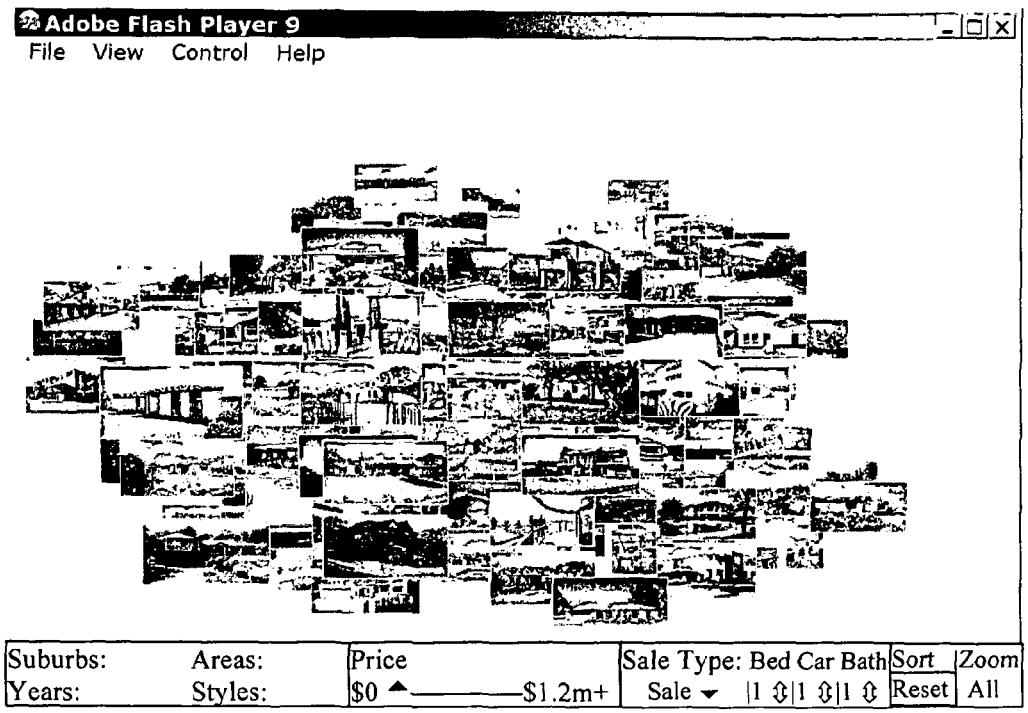
FIG. 14 is an example of an interface for a real estate website according to an embodiment of the invention.
Figure 15:
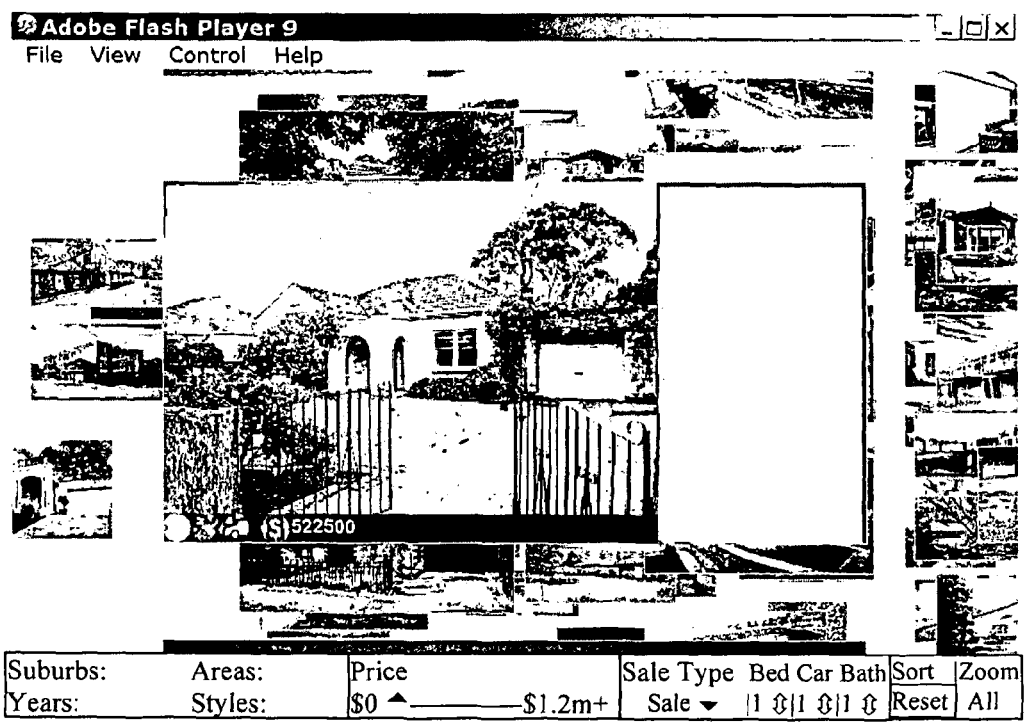
FIG. 15 is an example of a house selected in the dataset shown in FIG. 14 according to an embodiment of the invention.

FIG. 14 is an example of an interface for a real estate website according to an embodiment of the invention. The interface allows display and searching of houses for sale on the real estate site. In this embodiment the object is a house and the image displayed is an image of the house. A search interface on the lower panel allows a user to search through the available houses according to metadata such as suburb, house age, area, style, price, type of sale, bedrooms, carports, and bathrooms. FIG. 15 is an example of a house selected in the dataset shown in FIG. 14 according to an embodiment of the invention. In this case additional metadata is provided regarding the selected house.

The present invention provides an improved system and method for visualising a collection of objects. It provides a useful method for displaying representations of objects in 3D, based on metadata attributes or properties so that in many case the 3D axes correspond to axes of relevance to the user. Further by performing an adjustment or declustering step in which the original order is preserved, provides an improved visualisation of the collection of objects. That is whilst the points in the 3D viewing space are adjusted in a way that preserves the structural relationship between the objects whilst optimising the viewing volume. That is why the natural order or distribution may be an accurate and truthful distribution, it is often a poor choice for allowing a user to effectively visualise the objects as it is frequently subject to clustering and clumping of data which inhibits exploration of the data. This allows a user to visualise and navigate the collection or set of objects, allowing them to scan a large collection and rapidly identify a group of objects or an object of interest. A study of over 50 subjects was performed in which participants were asked to locate a hidden image on a hard disk. Participants attempted to locate the images using either the Windows Search Tool and using an application executing an embodiment of the present invention. This study showed an average 80% reduction in search and find times using an embodiment of the method described herein.

Embodiment of the method described herein are particularly advantageous for applications such as visualising search results, or when browsing an online store. In many cases searches or browsing is done in a very adhoc fashion, as searchers are not completely certain what they are searching for, or what are appropriate terms to use in a search, and thus amount to fishing exercises by the searcher. In such cases providing a visualisation of the results which is easy for the user to navigate and explore is often of more importance than a truthful representation. This adjusted representation allows a large collection of visual data to be displayed. A user can quickly scan this collection and are able to rapidly locate groups of objects, or an object of interest, often using their peripheral vision. Also as the method retains order information or structural relationships between objects, the display is more informative and thus of more value than a completely arbitrary grid display, in which each item is simply placed at a regular space from the previous item. Embodiments described herein allow a wide range of metadata to be used as the basis for displaying the data, including the use of more than 3 Dimensions. In many cases image metadata such as average Red, Green, Blue content, and image brightness can be effectively used to distribute a collection of images. The declustering step also allows compensation for clustering that often occurs as the results of projecting more than 3 metadata (dataspace) dimensions down to 3 viewing space dimensions.

The 3D interface provides a way of showing a large number of results in a compact space thereby optimising the use of the viewing volume, and in some embodiments allows the user to select what metadata is used to display the results as well as allowing the user to explore the results by controlling the viewing point. Adjustment or declustering the data provides the user with an improved view of the results, and also allows a user to see related results which may act as a visual clue for identifying objects of primary interest. Embodiments of the invention may be used in a variety of applications such as for searching hard disks, displaying objects in a website or displaying the results from a search engine. The ability to effectively display a complete collection in 3D has numerous applications in a web or online environment, and in particular for displaying objects for sale in an online store. An online store can effectively display all their products for sale, or those matching a user search and then allow the user explore the available products. As the results are compactly provided in 3D the user (shopper) can quickly visualise the range of products for sale, and relative differences between them. This approach allows them to rapidly identify products of greatest interest whilst providing reassurance that they have not missed something. This increased speed and reassurance to the shopper may then translate to an increased likelihood of a sale. Additionally by providing an explorable 3D visual representation of search results, embodiments of the invention can also be used as part of an interface for a search engine. In one embodiment the search engine includes a metadata database that learns associations based on actual user interaction with the search results thereby ensuring more relevant information is retrieved in future, and can account for poor or narrow choice of search terms by users.

Those of skill in the art would understand that information and signals may be represented using any of a variety of technologies and techniques. For example, data, instructions, commands, information, signals, bits, symbols, and chips may be referenced throughout the above description may be represented by voltages, currents, electromagnetic waves, magnetic fields or particles, optical fields or particles, or any combination thereof. Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. The steps of a method or algorithm described in connection with the embodiments disclosed herein may be embodied directly in hardware, in a software module executed by a processor, or in a combination of the two. For a hardware implementation, processing may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. Software modules, also known as computer programs, computer codes, or instructions, may contain a number of source code or object code segments or instructions, and may reside in any computer readable medium such as a RAM memory, flash memory, ROM memory, EPROM memory, registers, hard disk, a removable disk, a CD-ROM, a DVD-ROM or any other form of computer readable medium. In the alternative, the computer readable medium may be integral to the processor. The processor and the computer readable medium may reside in an ASIC or related device. The software codes may be stored in a memory unit and executed by a processor. The memory unit may be implemented within the processor or external to the processor, in which case it can be communicatively coupled to the processor via various means as is known in the art.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers. The reference to any prior art in this specification is not, and should not be taken as, an acknowledgment of any form of suggestion that such prior art forms part of the common general knowledge. It will be appreciated by those skilled in the art that the invention is not restricted in its use to the particular applications described. Neither is the present invention restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention as set forth and defined by the following claims.

The invention claimed is:

1. A method for displaying a plurality of objects in a three dimensional (3D) viewing space on a display device, each object having a plurality of associated metadata attributes, the method comprising:
    associating a point in a 3 dimensional (3D) viewing space for each of the plurality of objects, wherein each dimension is based upon one or more metadata attributes and each coordinate of the point is based upon the value of the respective metadata attributes of the object;
    computationally adjusting the point associated with each object by adding an offset wherein the adjustment is performed so as to reduce the clustering of points in the 3D viewing space whilst maintaining the relative order of the points, and is performed after the step of associating a point in a 3 dimensional (3D) viewing space for each of the plurality of objects;
    providing the adjusted points to a display device for displaying a visual representation of each of the plurality of objects to a user.

2. The method as claimed in claim 1, wherein maintaining the relative order of the points comprises maintaining the relative per axis order of the points for each axis of the 3D viewing space and adding an offset comprises adding a per axis offset for each of the three dimensions.

3. The method as claimed in claim 1, wherein associating a point in a 3D viewing space comprises:
    receiving a set of metadata attributes associated with the plurality of objects;
    defining a dataspace based upon the set of metadata attributes, wherein each point in the dataspace is represented by an n-tuple, wherein each element of the n-tuple is associated with at least one of the metadata attribute in the set;
    associating an n-tuple with each object based on the values of the associated metadata attributes;
    defining a 3D viewing space based upon an axis wise linear combination of the metadata attributes associated with each of the plurality of objects; and
    projecting the n-tuple associated with each object into the 3D viewing space to obtain a point associated with the object in the 3D viewing space.

4. The method as claimed in claim 3, wherein the set of metadata attributes associated with the plurality of objects are selected by a user using an associated user interface.

5. A method as claimed in claim 3, wherein the step of associating an n-tuple with each object further comprises ordering one or more of the plurality of associated metadata attributes according to a predetermined ordering criteria for at least one of the elements in the n-tuple and assigning the rank of the object in the ordering as the value of the respective element in the n-tuple.

6. A method as claimed in claim 3, further comprising scaling the n-tuple associated with each object, so that each of the n-elements of the n-tuples have a common scale.

7. A method as claimed in claim 6, wherein the common scale is [0, 1].

8. A method as claimed in claim 3, wherein the step of projecting the n-tuple associated with each object further comprises:

associating a unit length projection vector in the 3D viewing space with each element of the n-tuple, wherein each unit length projection vector begins at the origin of the 3D viewing space;

associating a point in the 3D viewing space with the object by projecting each n-tuple using the vector associated with each element of the n-tuple; and separately scaling each of the 3 axes, such that all points are in the range [0, 1] and the prescaling order of the points along each axis is preserved.

9. The method as claimed in claim 1 wherein the step of computationally adjusting the point associated with each object comprises:

rescaling each point so that all points are distributed within an SxSxS cube in the 3D viewing space;

adjusting the coordinates of the plurality of points, wherein the coordinates associated with each axis of the 3D viewing space are separately adjusted and the adjustment method for adjusting the coordinate associated with an axis comprises:

sorting the points on the basis of the value of the coordinate associated with a first axis;

associating an empty grid with the plurality of sorted points wherein the first dimension of the grid is associated with the coordinate associated with the second axis and the second dimension of the grid is associated with the coordinate associated with the third axis;

associating a grid clear counter with the grid, wherein the initial value of the grid clear counter is zero;

associating each point with a grid cell according to the sorted order and assigning the current value of the grid clear counter with the adjusted value, wherein associating a point with a grid cell comprises:

calculating an initial grid cell location for the point based upon rounding to the nearest integer the coordinates of the point associated with each dimension of the grid;

searching for the first empty grid cell in a search space of a predetermined search size centred on the initial grid cell location wherein if an empty grid cell is found, then associating and occupying the empty grid cell with the point and assigning the current value of the grid clear counter to the adjusted value of the point, else if no empty grid cell is found in the search space then emptying the grid, incrementing the grid clear counter and associating and occupying the now empty grid cell corresponding to the initial grid cell location with the point and assigning the current value of the grid clear counter to the adjusted value of the point.

10. The method as claimed in claim 9 wherein the predetermined search size is two grid cells in either direction from a central cell.

11. The method as claimed in claim 9 wherein S is calculated using the scaling function $$S = \sqrt[C]{N} + M = N^{\frac{1}{C}} + M,$$

where C is an estimate of the clustering of the data and is the range [1,3.5] and M is a lower size limit and is in the range [0, 0.1].

12. The method as claimed in claim 9, wherein a post adjustment scaling factor is applied to all points.

13. The method as claimed in claim 9, wherein the one or more metadata attributes used to base dimensions of the 3D viewing space on are selected by the user.

14. The method as claimed in claim 1, wherein the step of computationally adjusting the point associated with each object is performed using a statistically based adjustment.

15. The method as claimed in claim 1, wherein the step of computationally adjusting the point associated with each object comprises:

for at least one axis in the 3D viewing space:

determining an estimate of the average spacing of points along the respective axis;

iterating through the points associated with each object according to the order of points along the respective axis;

determining the on axis distance to the previous point; and adjusting the value of the coordinate of the current point so that the on axis distance to the previous point is closer to the determined estimate.

16. The method as claimed in claim 15, wherein the adjusted value is the location of the previous point plus the determined distance multiplied by a scaling factor, wherein if the determined distance was greater than the average spacing then the scaling factor is less than 1, and if the determined distance was less than the average spacing then the scaling factor is greater than 1.

17. The method as claimed in claim 1, wherein the step of computationally adjusting the point associated with each object comprises:

determining the on-axis average spacing of a predetermined number of adjacent points for at least one axis in the 3D viewing space; and increasing the spacing of the predetermined number of adjacent points if the determined average spacing is less than a predetermined minimum spacing threshold.

18. The method as claimed in claim 1, wherein the step of computationally adjusting the point associated with each object by adding an offset comprises:

for at least one axis in the 3D viewing space:

iterating through the points associated with each object according to the order of points along the respective axis; and adjusting the value of the coordinate of each point by addition of an offset distance if it is less than a threshold distance from the coordinate value of the previous point for the respective axis.

19. The method as claimed in claim 18, wherein the offset distance is a fixed distance from the previous point.

20. The method as claimed in claim 1, wherein the step of providing the adjusted points to a display device for displaying to a user comprises:

defining a viewing point in the 3D viewing space;

associating a visual representation with each object;

orientating the visual representation associated with each object in a plane substantially normal to the vector defined by the viewing point and the adjusted point associated with the object; and providing the plurality of orientated visual representations and the viewing point to a display device for display to a user.

21. The method as claimed in claim 1, further comprising the step of receiving a plurality of objects, wherein the plurality of objects are the results of a search performed by a user in an associated user interface.

22. The method as claimed in claim 1, further comprising the step of receiving a plurality of objects, wherein the plurality of objects are obtained by user selection in an associated user interface.

23. A system for displaying a plurality of objects in a three dimensional (3D) viewing space on a display device, the system comprising:
- a first computing device comprising at least one processor and associated memory, the associated memory storing instructions for execution by the at least one processor, wherein the at least one processor is configured to:
  - receive a plurality of objects, each of the plurality of objects having a plurality of associated metadata attributes;
  - associate a point in a 3 dimensional (3D) viewing space for each of the plurality of objects, wherein each dimension is based upon one or more metadata attributes and each coordinate of the point is based upon the value of the respective metadata attributes of the object;
  - computationally adjust the point associated with each object by adding an offset wherein the adjustment is performed so as to reduce the clustering of points in the 3D viewing space whilst maintaining the relative order of the points and is performed after the at least one processor has associated a point in a 3 dimensional (3D) viewing space for each of the plurality of objects;
  - provide the adjusted points to a display device; and
- a display device for displaying a representation of each of the plurality of objects in a user interface based upon the adjusted points received from the first computing device.

24. A system as claimed in claim 23, wherein the user interface further receives a search criteria from the user and provides the search criteria to the first computing device and the at least one processor of the first computing device is configured to locate the plurality of objects based upon the search criteria.

25. A system as claimed in claim 23, wherein the user interface further receives a search criteria from the user and an second computing device associated with the display device comprises at least one processor and a memory storing instructions for execution by the at least one processor, and the at least one processor in the second computing device is configured to perform a search and locate a plurality of objects, and provides the plurality of objects to the first computing device.

26. A system as claimed in claim 23, wherein the user interface further receives one or more metadata attributes from the user and the at least one processor in the second computing device is configured to provide the one or more metadata attributes to the first computing device for defining the dimensions of the 3D viewing space.

27. A non-transitory computer usable medium having a computer readable program code embodied therein, said computer readable program code adapted to be executed by at least one processor to implement a method for displaying a plurality of objects in a three dimensional (3D) viewing space on a display device, each object having a plurality of associated metadata attributes, the method comprising:
- associating a point in a 3 dimensional (3D) viewing space for each of the plurality of objects, wherein each dimension is based upon one or more metadata attributes and each coordinate of the point is based upon the value of the respective metadata attributes of the object;
- computationally adjusting the point associated with each object by adding an offset wherein the adjustment is performed so as to reduce the clustering of points in the 3D viewing space whilst maintaining the relative order of the points and is performed after the step of associating a point in a 3 dimensional (3D) viewing space for each of the plurality of objects; and
- providing the adjusted points to a display device for displaying a visual representation of each of the plurality of objects to a user.

28. The non-transitory computer usable medium as claimed in claim 27, wherein maintaining the relative order of the points comprises maintaining the relative per axis order of the points for each axis of the 3D viewing space.

29. The non-transitory computer usable medium as claimed in claim 27, wherein associating a point in a 3D viewing space comprises:
- receiving a set of metadata attributes associated with the plurality of objects;
- defining a dataspace based upon the set of metadata attributes, wherein each point in the dataspace is represented by an n-tuple, wherein each element of the n-tuple is associated with at least one of the metadata attribute in the set;
- associating an n-tuple with each object based on the values of the associated metadata attributes;
- defining a 3D viewing space based upon an axis wise linear combination of the metadata attributes associated with each of the plurality of objects; and
- projecting the n-tuple associated with each object into the 3D viewing space to obtain a point associated with the object in the 3D viewing space.

30. The non-transitory computer usable medium as claimed in claim 29, wherein the set of metadata attributes associated with the plurality of objects are selected by a user using an associated user interface.

31. A non-transitory computer usable medium as claimed in claim 30, wherein the step of projecting the n-tuple associated with each object further comprises:
- associating a unit length projection vector in the 3D viewing space with each element of the n-tuple, wherein each unit length projection vector begins at the origin of the 3D viewing space;
- associating a point in the 3D viewing space with the object by projecting each n-tuple using the vector associated with each element of the n-tuple; and
- separately scaling each of the 3 axes, such that all points are in the range and the prescaling order of the points along each axis is preserved.

32. The non-transitory computer usable medium as claimed in claim 27 wherein the step of adjusting the point associated with each object by adding an offset comprises:
- rescaling each point so that all points are distributed within an SxSxS cube in the 3D viewing space;
- adjusting the coordinates of the plurality of points, wherein the coordinates associated with each axis of the 3D viewing space are separately adjusted and the adjustment method for adjusting the coordinate associated with an axis comprises:
  - sorting the points on the basis of the value of the coordinate associated with a first axis;
  - associating an empty grid with the plurality of sorted points wherein the first dimension of the grid is associated with the coordinate associated with the second axis and the second dimension of the grid is associated with the coordinate associated with the third axis;

associating a grid clear counter with the grid, wherein the initial value of the grid clear counter is zero;

associating each point with a grid cell according to the sorted order and assigning the current value of the grid clear counter with the adjusted value, wherein associating a point with a grid cell comprises:

calculating an initial grid cell location for the point based upon rounding to the nearest integer the coordinates of the point associated with each dimension of the grid;

searching for the first empty grid cell in a search space of a predetermined search size centred on the initial grid cell location wherein if an empty grid cell is found, then associating and occupying the empty grid cell with the point and assigning the current value of the grid clear counter to the adjusted value of the point, else if no empty grid cell is found in the search space then emptying the grid, incrementing the grid clear counter and associating and occupying the now empty grid cell corresponding to the initial grid cell location with the point and assigning the current value of the grid clear counter to the adjusted value of the point.

33. The non-transitory computer usable medium as claimed in claim 27, wherein the step of providing the adjusted points to a display device for displaying to a user comprises:

defining a viewing point in the 3D viewing space;

associating a visual representation with each object;

orientating the visual representation associated with each object in a plane substantially normal to the vector defined by the viewing point and the adjusted point associated with the object; and providing the plurality of orientated visual representations and the viewing point to a display device for display to a user.

34. The non-transitory computer usable medium as claimed in claim 27, further comprising the step of receiving a plurality of objects, wherein the plurality of objects are the results of a search performed by a user in an associated user interface.

35. The non-transitory computer usable medium as claimed in claim 27, further comprising the step of receiving a plurality of objects, wherein the plurality of objects are obtained by user selection in an associated user interface.

36. An apparatus, comprising:

at least one processor; and a memory coupled to the at least one processor, the memory containing instructions for execution by the at least one processor for causing the processor to perform a method for displaying a plurality of objects in a three dimensional (3D) viewing space on a display device, each object having a plurality of associated metadata attributes, wherein the processor is configured to:

associate a point in a 3 dimensional (3D) viewing space for each of the plurality of objects, wherein each dimension is based upon one or more metadata attributes and each coordinate of the point is based upon the value of the respective metadata attributes of the object;

computationally adjust the point associated with each object by adding an offset wherein the adjustment is performed so as to reduce the clustering of points in the 3D viewing space whilst maintaining the relative order of the points, and is performed after the at least one processor has associated a point in a 3 dimensional (3D) viewing space for each of the plurality of objects;

providing the adjusted points to a display device for displaying a visual representation of each of the plurality of objects to a user.

37. The apparatus as claimed in claim 36, wherein maintaining the relative order of the points comprises maintaining the relative per axis order of the points for each axis of the 3D viewing space.

38. The apparatus as claimed in claim 36, wherein configuring the at least one processor to associate a point in a 3D viewing space comprises configuring the at least one processor to:

receive a set of metadata attributes associated with the plurality of objects;

define a dataspace based upon the set of metadata attributes, wherein each point in the dataspace is represented by an n-tuple, wherein each element of the n-tuple is associated with at least one of the metadata attribute in the set;

associate an n-tuple with each object based on the values of the associated metadata attributes;

define a 3D viewing space based upon an axis wise linear combination of the metadata attributes associated with each of the plurality of objects; and project the n-tuple associated with each object into the 3D viewing space to obtain a point associated with the object in the 3D viewing space.

39. The apparatus as claimed in claim 38, wherein the set of metadata attributes associated with the plurality of objects are selected by a user using an associated user interface.

40. The apparatus as claimed in claim 39, wherein configuring the at least one processor to project the n-tuple associated with each object further comprises configuring the at least one processor to:

associate a unit length projection vector in the 3D viewing space with each element of the n-tuple, wherein each unit length projection vector begins at the origin of the 3D viewing space;

associate a point in the 3D viewing space with the object by projecting each n-tuple using the vector associated with each element of the n-tuple; and separately scale each of the 3 axes, such that all points are in the range and the prescaling order of the points along each axis is preserved.

41. The apparatus as claimed in claim 36 wherein configuring the at least one processor to computationally adjust the point associated with each object by adding an offset comprises configuring the at least one processor to:

rescale each point so that all points are distributed within an SxSxS cube in the 3D viewing space;

adjust the coordinates of the plurality of points, wherein the coordinates associated with each axis of the 3D viewing space are separately adjusted and the adjustment method for adjusting the coordinate associated with an axis comprises:

sorting the points on the basis of the value of the coordinate associated with a first axis;

associating an empty grid with the plurality of sorted points wherein the first dimension of the grid is associated with the coordinate associated with the second axis and the second dimension of the grid is associated with the coordinate associated with the third axis;

associating a grid clear counter with the grid, wherein the initial value of the grid clear counter is zero;

associating each point with a grid cell according to the sorted order and assigning the current value of the grid clear counter with the adjusted value, wherein associating a point with a grid cell comprises:

calculating an initial grid cell location for the point based upon rounding to the nearest integer the coordinates of the point associated with each dimension of the grid;

searching for the first empty grid cell in a search space of a predetermined search size centred on the initial grid cell location wherein if an empty grid cell is found, then associating and occupying the empty grid cell with the point and assigning the current value of the grid clear counter to the adjusted value of the point, else if no empty grid cell is found in the search space then emptying the grid, incrementing the grid clear counter and associating and occupying the now empty grid cell corresponding to the initial grid cell location with the point and assigning the current value of the grid clear counter to the adjusted value of the point.

42. The apparatus as claimed in claim 36, wherein configuring the at least one processor to provide the adjusted points to a display device for displaying to a user comprise configuring the at least one processor to:

define a viewing point in the 3D viewing space;

associate a visual representation with each object;

orientate the visual representation associated with each object in a plane substantially normal to the vector defined by the viewing point and the adjusted point associated with the object; and provide the plurality of orientated visual representations and the viewing point to a display device for display to a user.

43. The apparatus as claimed in claim 36, wherein the at least one processor is further configure to receive a plurality of objects, wherein the plurality of objects are the results of a search performed by a user in an associated user interface.

44. The apparatus as claimed in claim 36, further comprising the step of receiving a plurality of objects, wherein the plurality of objects are obtained by user selection in an associated user interface.

45. The apparatus as claimed in claim 36, further comprising a display device.

\* \* \* \* \*